US009791674B1

(12) United States Patent
Topliss et al.

(10) Patent No.: US 9,791,674 B1
(45) Date of Patent: Oct. 17, 2017

(54) MINIATURE CAMERA ZOOM ACTUATOR WITH MAGNET-INDUCED FRICTION

(71) Applicant: Apple Inc., Cupertino, CA (US)

(72) Inventors: Richard J. Topliss, Campbell, CA (US); Richard H. Tsai, Cupertino, CA (US); Albert A. Ho, Mountain View, CA (US); Thomas M. Gregory, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 14/820,487

(22) Filed: Aug. 6, 2015

Related U.S. Application Data

(60) Provisional application No. 62/113,199, filed on Feb. 6, 2015.

(51) Int. Cl.
| | |
|---|---|
| *G02B 13/00* | (2006.01) |
| *H04N 5/232* | (2006.01) |
| *H04N 5/225* | (2006.01) |
| *G02B 7/02* | (2006.01) |

(52) U.S. Cl.
CPC .......... *G02B 13/009* (2013.01); *G02B 7/023* (2013.01); *H04N 5/2254* (2013.01); *H04N 5/23296* (2013.01); *G02B 13/001* (2013.01); *G03B 2205/0061* (2013.01); *H04N 5/2257* (2013.01)

(58) Field of Classification Search
CPC .......... G02B 13/009; G02B 7/04; G02B 7/08; G02B 7/023; G02B 13/001; G02B 7/102; G02B 7/09–7/10; H04N 5/2254; H04N 5/2253; H04N 5/2257; H04N 5/2252; H04N 5/23287; H04N 5/23296; G03B 3/10; G03B 2205/0046; G03B 2205/0061; G03B 2205/0069; G03B 2205/0053
See application file for complete search history.

(56) References Cited

U.S. PATENT DOCUMENTS

| | | | |
|---|---|---|---|
| 5,912,527 A | 6/1999 | Karrai | |
| 7,902,724 B2 | 3/2011 | Matsuki | |
| 8,405,921 B2 * | 3/2013 | Ko | ............ G02B 7/08 |
| | | | 359/824 |

(Continued)

FOREIGN PATENT DOCUMENTS

WO      2014/160966      10/2014

*Primary Examiner* — Michael Osinski
(74) *Attorney, Agent, or Firm* — Robert C. Kowert; Meyertons, Hood, Kivlin, Kowert & Goetzel, P.C.

(57) ABSTRACT

Some embodiments include a fixed chassis structure and a moveable carriage body carrying one or more lenses. The fixed chassis structure includes a magnetic friction track. The moveable carriage body carries one or more lenses. An electrically-controllable magnet is mounted to the moveable carriage body for generating a magnetic attraction force between the magnet and the magnetic friction track. The moveable carriage body is movably mounted to the chassis to allow movement along an optical axis through the one or more lenses. An inertial actuator is mounted to the moveable carriage body in an alignment such that the axis of motion of the actuator is parallel to the optical axis through the one or more lenses. The moveable carriage body is held in place with respect to the at least one allowed degree of freedom by one or more friction forces resulting from the magnetic attraction force.

20 Claims, 18 Drawing Sheets

(56) References Cited

U.S. PATENT DOCUMENTS

| | | | |
|---|---|---|---|
| 2006/0087752 A1* | 4/2006 | Park | G11B 7/0933 359/824 |
| 2006/0269262 A1* | 11/2006 | Shin | G02B 27/646 396/55 |
| 2007/0053082 A1* | 3/2007 | Sue | G03B 3/10 359/819 |
| 2007/0097531 A1* | 5/2007 | Kuo | G02B 7/08 359/823 |
| 2007/0133110 A1* | 6/2007 | Huang | G02B 7/023 359/824 |
| 2007/0171551 A1* | 7/2007 | Tsai | G02B 7/04 359/813 |
| 2008/0212212 A1* | 9/2008 | Matsuki | A61B 1/00188 359/824 |
| 2008/0231975 A1* | 9/2008 | Hou | H02K 41/0356 359/824 |
| 2009/0076332 A1* | 3/2009 | Iwasaki | A61B 1/00096 600/168 |
| 2010/0254032 A1* | 10/2010 | Matsuki | G02B 7/102 359/824 |
| 2011/0102665 A1* | 5/2011 | Takei | G02B 7/08 348/373 |
| 2012/0134034 A1* | 5/2012 | Niwa | G02B 7/023 359/824 |
| 2013/0094844 A1* | 4/2013 | Kang | G03B 3/10 396/125 |
| 2013/0120855 A1* | 5/2013 | Hu | G02B 7/102 359/696 |
| 2013/0155197 A1* | 6/2013 | Liang | H04N 5/2257 348/47 |
| 2013/0194683 A1* | 8/2013 | Machida | G02B 7/04 359/814 |
| 2013/0314517 A1* | 11/2013 | Makiyama | A61B 1/045 348/65 |
| 2013/0321938 A1* | 12/2013 | Ohno | G02B 7/09 359/824 |
| 2013/0329310 A1* | 12/2013 | Toyama | G02B 7/04 359/823 |
| 2014/0009675 A1* | 1/2014 | Chiu | H04N 5/2253 348/374 |
| 2014/0146392 A1* | 5/2014 | Fujinaka | G02B 27/646 359/557 |
| 2014/0218798 A1* | 8/2014 | Suzuka | G02B 27/646 359/557 |
| 2015/0049209 A1* | 2/2015 | Hwang | H04N 5/23287 348/208.11 |
| 2016/0033739 A1* | 2/2016 | Topliss | G03B 5/00 359/696 |
| 2016/0041381 A1* | 2/2016 | Makiyama | A61B 1/00096 359/824 |
| 2016/0054578 A1* | 2/2016 | Dong | G02B 27/646 359/557 |
| 2016/0142595 A1* | 5/2016 | Kim | H04N 5/2252 348/373 |
| 2016/0291286 A1* | 10/2016 | Grabau | G02B 7/102 |

\* cited by examiner

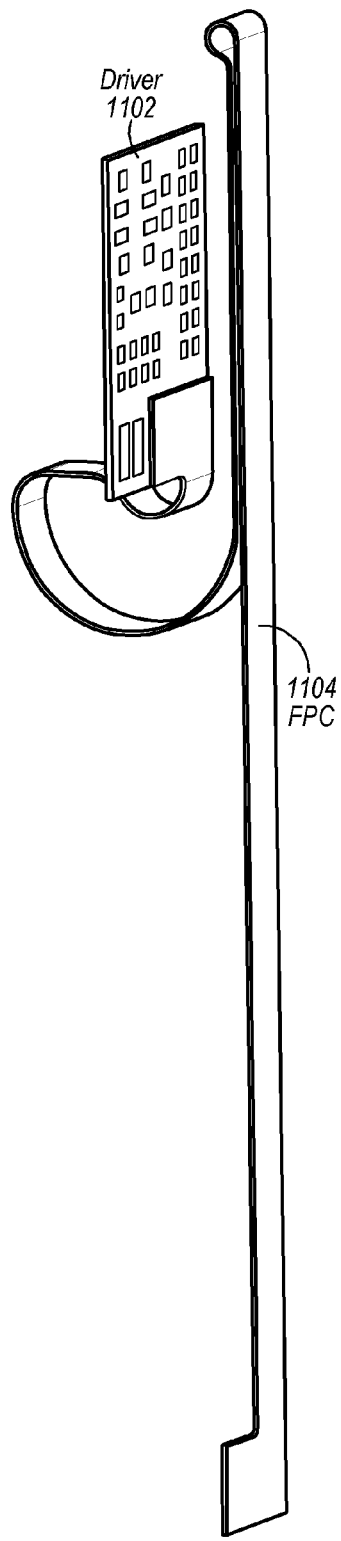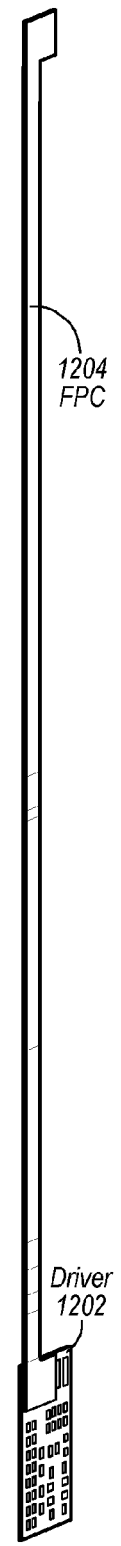
*FIG. 11*  *FIG. 12*

US 9,791,674 B1

MINIATURE CAMERA ZOOM ACTUATOR WITH MAGNET-INDUCED FRICTION

This application claims benefit of priority to U.S. Provisional Patent Application Ser. No. 62/113,199, filed Feb. 6, 2015, which is hereby incorporated by reference in its entirety.

BACKGROUND

Technical Field

This disclosure relates generally to control of the motion of camera components. More specifically, this disclosure relates to an actuator for a zoom lens in a miniature camera.

Description of the Related Art

Miniature cameras are typically used in mobile devices such as cellphones. In such devices, space is held to be at a premium and every effort is made to minimize the camera size. A zoom lens is a lens where the lens elements can be moved relative to one another to change the focal length of the lens. In doing so, this changes the field of view of the lens. In addition, such a lens is most typically required to adjust focus for different object distances. Many different configurations of zoom lens are possible. However, for a typical optical zoom lens, there are at least two lens groups that move independently of each other along the optical axis relative to the image sensor, but in a relational manner to each other. There are additionally typically further lens groups that remain stationary relative to the image sensor.

For large digital stills cameras (DSCs), such relational movements are often achieved by moving one intermediate component, such as a cylinder disposed around the lens that rotates about the optical axis. The cylinder may then has plural grooves on its inner surface to act as cam profiles, at least one groove for each moving lens group. In this way the rotation of the cylinder with a single actuator can achieve the controlled relational movement between different lens groups relative to the image sensor. Such mechanisms work well for DSCs, but are not suited to miniature cameras for several reasons. The most important reasons include manufacturing tolerances and associated clearances, and parasitic frictions and forces, and size constraints. For miniature cameras, the positional tolerances required for placing the lens groups are extremely tight; of the order of 10 um. This includes factors such as relative tilt between the lens groups, and the decenter relative to the nominal optical axis.

Unfortunately, for such precision mechanisms, manufacturing tolerances do not scale with size, and so a decenter error caused by a clearance between cam groove and pin follower on the lens group may be acceptable for a larger DSC, but unacceptable for a miniature camera.

SUMMARY OF EMBODIMENTS

Some embodiments provide a zoom actuator system. Some embodiments include a fixed chassis structure and a moveable carriage body carrying one or more lenses. The fixed chassis structure includes a magnetic friction track. The moveable carriage body carries one or more lenses. An electrically-controllable magnet is mounted to the moveable carriage body for generating a magnetic attraction force between the magnet and the magnetic friction track. The moveable carriage body is movably mounted to the chassis to allow movement along an optical axis through the one or more lenses. An inertial actuator is mounted to the moveable carriage body in an alignment such that the axis of motion of the actuator is parallel to the optical axis through the one or more lenses. The moveable carriage body is held in place with respect to the at least one allowed degree of freedom by one or more friction forces resulting from the magnetic attraction force.

BRIEF DESCRIPTION OF THE DRAWINGS

FIG. 11 depicts a carriage and connector, according to some embodiments.

FIG. 12 depicts a carriage and connector, according to some embodiments.

Figure 1:
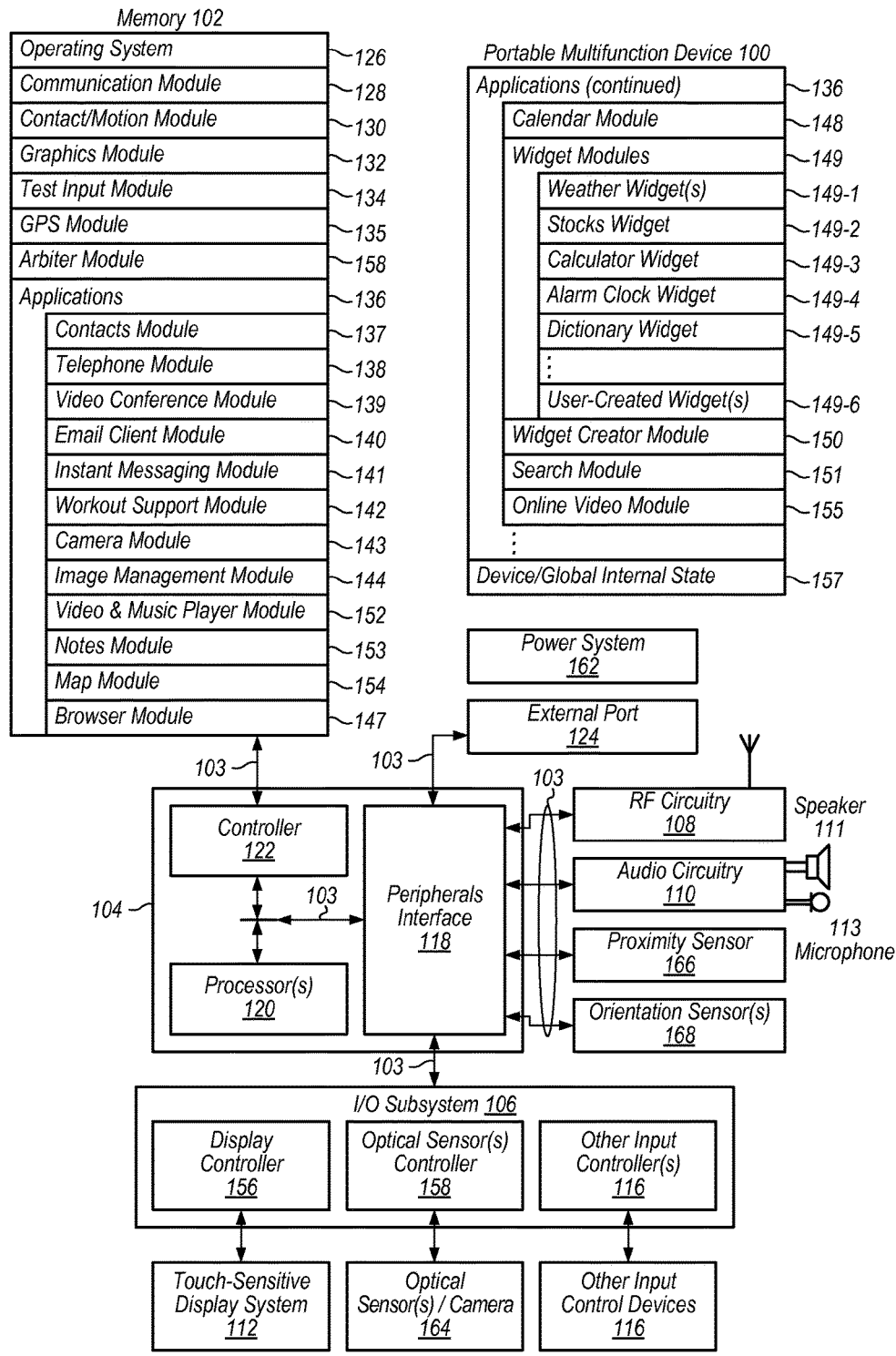
FIG. 1 illustrates a block diagram of a portable multifunction device with a camera in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/ circuits/components include structure (e.g., circuitry) that performs those task or tasks during operation. As such, the unit/circuit/component can be the to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction to Zoom Actuators

Some embodiments provide a zoom actuator system. Some embodiments include a fixed chassis structure and a moveable carriage body. The moveable carriage body carries one or more lenses. The moveable carriage body is movably mounted to the chassis structure so as to limit a plurality of degrees of freedom of movement of the moveable carriage body but to allow movement along an optical axis through the one or more lenses. An inertial actuator is mounted to the moveable carriage body in an alignment such that the axis of motion of the actuator is parallel to at least one allowed degree of freedom. The moveable carriage body is held in place with respect to the at least one allowed degree of freedom by one or more magnetically-induced friction forces received at one or more mechanical contacts (called datum contact surfaces) with the chassis structure. The inertial actuator is actionable to overcome the friction forces, and an inertial mass is mounted to the inertial actuator on a side opposite the carriage body.

In some embodiments, the moveable carriage body receives power and control signals to the inertial actuator through a flexible printed circuit, which in some embodiments coils behind the actuator. Some embodiments include a driver circuit mounted on the moveable carriage body. The moveable carriage body receives power and control signals for the driver circuit to the inertial actuator through a flexible printed circuit. Some embodiments include a driver circuit mounted on the moveable carriage body, and a position sensor, mounted on the moveable carriage body, for determining a position of the moveable carriage body. In some embodiments, the position sensor is connected to the driver circuit for reporting position information to the driver circuit.

In some embodiments, the inertial actuator includes a piezoelectric actuator. In some embodiments, the moveable carriage body contacts the chassis along multiple magnetic tracks inside a non-magnetic or less magnetic chassis case. The system further includes one or more electromagnets to the moveable carriage body to generate a contact force at the one or more magnetic material tracks so as to generate a friction force between the moveable carriage body and the multiple magnetic tracks. Some embodiments further include a driver circuit mounted on the moveable carriage body, and a magnetic (Hall) position sensor, mounted on the moveable carriage body, for determining a position of the moveable carriage body based on magnetic fields experienced by the position sensor.

Some embodiments include a long-throw actuator including a carriage moving along a track, which is constrained to substantially slide along the track without parasitic tilting motion. In some embodiments, a piezo actuator is mounted onto the moving carriage for whirring a separate inertial mass that mounted to the other end of the piezo for inertial actuation. In some embodiments, the carriage incorporates at least one magnet that is attracted to the track, so as to generate contact forces that work to maintain contact between the Carriage and track, which as a result generates friction forces between the carriage and the track, thereby resisting the carriage slipping along the track. In some embodiments, during operation electrical drive signals are applied to the piezo so as to generate cyclical inertial forces to the carriage so as to generate stick-slip motion of the carriage by asymmetrically breaking the friction forces between carriage and track, so as to generate net movement of the carriage along the track.

In some embodiments, two magnets are embedded in the generally non-magnetic track carriage, each predominantly attracting the carriage to different datum surfaces of the track, so as to effectively constrain the carriage motion to one degree of freedom along the track.

In some embodiments, the carriage does not touch the can or carriage at locations other than the two datum surfaces. In some embodiments, the track datum surfaces are flat and orthogonal to each other. In some embodiments, an electrical conduit is provided to route electrical signals to the moving carriage. In some embodiments, the operational portion of said conduit can be approximated in section to a J shape when the carriage is at one end of travel, with the end of the curved region of the J attached to the carriage, and the end of the straight region of the J acting as a fixed anchor. In some embodiments, the motion of the carriage is parallel to the straight portion of the J and the carriage moves away from its end of travel position in the upwards direction, as defined by the a J.

Some embodiments include a fixed chassis structure and a moveable lens carriage. In some embodiments, the fixed chassis structure includes a magnetic friction track. In some embodiments, the moveable carriage body carries one or more lenses. In some embodiments, the one or more magnets is mounted to the moveable carriage body. In some embodiments, the moveable carriage body is movably mounted to the chassis to allow movement along an optical axis through the one or more lenses. In some embodiments, an inertial actuator is mounted to the moveable carriage body in an alignment such that the axis of motion of the actuator is parallel to the optical axis through the one or more lenses. In some embodiments, the moveable carriage body is held in place with respect to the at least one allowed degree of freedom by one or more friction forces resulting from the magnetic attraction force.

In some embodiments, the moveable carriage body receives power and control signals to the inertial actuator through a flexible printed circuit configured to coil behind and unwind beneath the moveable carriage body during movement. In some embodiments, a second inertial actuator is mounted to the moveable carriage body in an alignment such that the axis of motion of the second inertial actuator is not parallel to the optical axis through the one or more lenses.

In some embodiments, the moveable carriage body includes one or more datum surfaces. In some embodiments, the datum surfaces serve as points of frictional contact between the moveable carriage and magnetic friction track. In some embodiments, the moveable carriage does not touch the fixed chassis structure except at the points of contact between the datum surfaces and the magnetic friction track.

In some embodiments, the fixed chassis structure includes an external housing of non-magnetic material. In some embodiments, the magnetic friction track includes a strip of magnetic material mounted inside an enclosure formed by the fixed chassis structure.

Some embodiments include a method for controlling the position of a camera component. In some embodiments, the method includes generating a magnetic attraction force between a moveable lens carriage body and a fixed chassis structure using one or more magnets mounted to the moveable lens carriage body. In some embodiments, the moveable carriage body is held in place with respect to at least one allowed degree of freedom by one or more friction forces resulting from the magnetic attraction force between the one or more magnets and a magnetic friction track of the moveable carriage structure. In some embodiments, the method includes applying a varying voltage to an inertial actuator attached to the moveable lens carriage body. In some embodiments, the inertial actuator includes a piezoelectric element, and variations in the varying voltage cause an expansion and a contraction of the piezoelectric element. In some embodiments, the contraction is slower than the expansion, such that a net force is created along a line of motion of the piezoelectric actuator, and during motion of the moveable lens carriage body, the net force is greater than the one or more friction forces resulting from the magnetic attraction force.

In some embodiments, the method further includes applying a varying second voltage to a second inertial actuator mounted to the moveable carriage body in an alignment such that the axis of motion of the second inertial actuator is not parallel to the optical axis through the one or more lenses.

In some embodiments, the applying a voltage to an inertial actuator attached to the moveable lens carriage body further includes generating stick-slip motion of the moveable carriage assembly by asymmetrically breaking the friction forces between moveable carriage assembly and the magnetic friction track so as to generate net movement of the carriage along the track.

In some embodiments, the generating the magnetic attraction force further includes generating a friction force at one or more datum surfaces of the moveable carriage body. In some embodiments, the datum surfaces serve as points of frictional contact between the moveable carriage and the magnetic friction track.

In some embodiments, the applying the voltage further includes driving the inertial actuator attached to the moveable lens carriage body with an asymmetric oscillatory electrical signal so that in one half of the cycle the inertial acceleration is higher than in the other.

In some embodiments, the applying a voltage further includes driving an inertial actuator attached to the moveable lens carriage body with an asymmetric oscillatory electrical signal so that in one half of the cycle the inertial acceleration is higher than in the other such that, during at least a portion of the oscillatory motion, inertial forces generated by the inertial actuator exceed a magnetic friction of datum contact points between the moveable carriage body and the chassis structure to cause sliding in an allowed linear degree of freedom.

In some embodiments, generating the magnetic attraction force between the moveable lens carriage body and the fixed chassis structure by applying the first voltage to one or more electrically controllable magnets mounted to the moveable lens carriage body further includes attracting the moveable lens carriage body to different datum surfaces of the track, so as to effectively constrain a carriage motion of the moveable lens carriage body to one degree of freedom along the track.

Some embodiments include a non-transitory computer-readable storage medium storing program instructions. In some embodiments, the program instructions are computer-executable to implement measuring a position of a carriage relative to a fixed chassis structure, wherein the chassis carries one or more magnets for generating a magnetic attraction force between a moveable lens carriage body and a fixed chassis structure.

In some embodiments, the program instructions are computer-executable to implement applying a varying voltage to an inertial actuator attached to the moveable lens carriage body to generate a net force. In some embodiments, variations in the varying first voltage cause an expansion and a contraction of a piezoelectric element along an optical axis of a lens of the moveable lens carriage body, and during motion of the moveable lens carriage body, the net force is greater than the one or more friction forces resulting from the magnetic attraction force.

In some embodiments, program instructions are computer-executable to implement applying a second voltage to a second inertial actuator mounted to the moveable carriage body in an alignment such that the axis of motion of the second inertial actuator is not parallel to the optical axis through the one or more lenses.

In some embodiments, program instructions computer-executable to implement generating a friction force at one or more datum surfaces of the moveable carriage body. In some embodiments, the datum surfaces serve as exclusive points of frictional contact between the moveable carriage and the magnetic friction track.

In some embodiments, the program instructions computer-executable to implement the applying a varying voltage to an inertial actuator attached to the moveable lens carriage body further include program instructions computer-executable to implement generating stick-slip motion of the moveable carriage assembly by asymmetrically breaking the friction forces between moveable carriage assembly and the magnetic friction track so as to generate net movement of the carriage along the track.

In some embodiments, the program instructions computer-executable to implement the applying the voltage further include program instructions computer-executable to implement driving the inertial actuator attached to the moveable lens carriage body with an asymmetric oscillatory electrical signal so that in one half of the cycle the inertial acceleration is higher than in the other.

In some embodiments, the program instructions computer-executable to implement the applying the voltage further include program instructions computer-executable to implement driving an inertial actuator attached to the moveable lens carriage body with an asymmetric oscillatory electrical signal so that in one half of the cycle the inertial acceleration is higher than in the other such that, during at least a portion of the oscillatory motion, inertial forces generated by the inertial actuator exceed a magnetic friction of datum contact points between the moveable carriage body and the chassis structure to cause sliding in an allowed linear degree of freedom.

In some embodiments, the one or more magnets include one or more electrically controllable magnets, and the moveable carriage body receives power and control signals to the inertial actuator and the one or more magnets through a flexible printed circuit configured to coil behind and unwind beneath the moveable carriage body during movement.

In some embodiments, generating a magnetic attraction force between a moveable lens carriage body and a fixed chassis structure from magnets mounted to the moveable lens carriage body. In some embodiments, the moveable carriage body is controllably held in place with respect to at least one allowed degree of freedom by one or more friction forces resulting from the magnetic attraction force between the one or more magnets and a magnetic friction track of the moveable carriage structure further includes generating a magnetic attraction force between a moveable lens carriage body and a fixed chassis structure by applying a second voltage to one or more electrically controllable magnets mounted to the moveable lens carriage body. In some embodiments, the moveable carriage body is controllably held in place with respect to at least one allowed degree of freedom by one or more friction forces resulting from the magnetic attraction force between the one or more electrically controllable magnets and a magnetic friction track of the moveable carriage structure.

Some embodiments include a method for controlling camera components. In some embodiments, the method includes applying a first voltage to an inertial actuator attached to a moveable lens carriage body. The inertial actuator is a piezoelectric element, and the first voltage causes an expansion of the piezoelectric element. In some embodiments, the method further includes applying a second voltage to the inertial actuator attached to a moveable lens carriage body. The second voltage causes a contraction of the piezoelectric element, and the contraction is slower than the expansion.

In some embodiments, the method further includes applying a third voltage to an inertial actuator attached to a moveable lens carriage body. The third voltage causes a contraction of the piezoelectric element. In some embodiments, the method further includes applying a fourth voltage to the inertial actuator attached to a moveable lens carriage body. The fourth voltage causes an expansion of the piezoelectric element, and the expansion is slower than the contraction.

In some embodiments, the method further includes measuring a position of the moveable lens carriage body using a magnetic sensor attached to the moveable lens carriage body. In some embodiments the applying a first voltage and the applying a second voltage further comprise driving an inertial actuator attached to the moveable lens carriage body with an asymmetric oscillatory electrical signal so that in one half of the cycle the inertial acceleration is higher than in the other.

In some embodiments, the applying a first voltage and the applying a second voltage further comprise driving an inertial actuator attached to the moveable lens carriage body with an asymmetric oscillatory electrical signal so that in one half of the cycle the inertial acceleration is higher than in the other such that, during at least a portion of the oscillatory motion, inertial forces generated by the inertial actuator exceed a static friction of contact points between the moveable carriage body and the chassis structure to cause sliding in an allowed linear degree of freedom.

In some embodiments, the applying a first voltage and the applying a second voltage further comprise driving an inertial actuator attached to the moveable lens carriage body with an asymmetric oscillatory electrical signal having a sawtooth waveform.

In some embodiments, the method further includes driving an inertial actuator attached to a second moveable lens carriage body with an asymmetric oscillatory electrical signal so that in one half of the cycle the inertial acceleration is higher than in the other such that the second moveable lens carriage body moves with respect to the first moveable lens carriage body.

Some embodiments may include camera module including a means for applying a first voltage to an inertial actuator attached to a moveable lens carriage body, and applying a second voltage to the inertial actuator attached to a moveable lens carriage body, as described herein. The camera module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform applying a first voltage to an inertial actuator attached to a moveable lens carriage body, and applying a second voltage to the inertial actuator attached to a moveable lens carriage body, as described herein. Other embodiments of the non-uniform camera module may be at least partially implemented by hardware circuitry and/or firmware stored, for example, in a non-volatile memory.

Some embodiments provide a zoom actuator system. In some embodiments, a moving body slides on a fixed chassis structure. In some embodiments, the fixed chassis structure substantially limits the motion of the moving body to one linear degree of freedom.

In some embodiments, the moving body contacts the chassis at multiple discrete points so as to constrain the motion. In some embodiments, at least one of these contact points is forced into contact with the track based on a magnetic force from the moving body so as to generate a contact force at others of the contact points, so as to generate a sufficient friction force to both prevent any unwanted sliding at the contact points. In some embodiments, there is mounted on the moving body an inertial actuator, which when actuated with appropriate electrical signals can generate inertial loads that exceed the magnetically-generated friction of the contacts points and yield motion in the allowed linear degree(s) of freedom.

In some embodiments, the inertial actuator is driven with an asymmetric oscillatory electrical signal so that in one half of the cycle the inertial acceleration is higher than in the other, and during at least a portion of the oscillatory motion, the inertial forces exceed the static friction of the contact points and cause sliding in the allowed linear degree of freedom.

In some embodiments, multiple such oscillatory cycles, in combination, yield a net motion of the moving body in one direction relative to the chassis, and the reverse motion can be achieved by appropriately altering the asymmetric electrical signal.

In some embodiments, a programmable driver circuit for the inertial actuator is also mounted on the moving body. In some embodiments, connections to power the driver circuit are provided through the multiple electrical contacts via the contact points, at least two include a positive power terminal and a negative power terminal to power and deliver digital commands to the driver circuit so as to determine how to move the inertial actuator.

In some embodiments, the moving body includes a lens group as part of a lens system, and the allowed linear degree of freedom is parallel to the lens optical axis. In some embodiments, the actuator system is used to appropriately move a lens groups in a zoom lens. In some embodiments, multiple moving bodies move along the same tracks in the same chassis. In some embodiments position sensors are incorporated on each of the multiple moving bodies, so as to measure the position of each moving body in the chassis. In some embodiments, the position sensors are magnetic. In other embodiments, the position sensors are capacitive.

In some embodiments, a patterned trace forms part of the chassis, and interacts with a magnetic sensor on the moving body, such that the magnetic field at the sensor is measured as the moving body moves in the chassis, and the current and historical measurements can be used to assess position of the moving body.

In some embodiments, a patterned conductive trace forms part of the chassis, and interacts with a conductive plate on the moving body to create a capacitance sensor, such that the capacitance of the sensor is measured as the moving body moves in the chassis, and the current and historical measurements can be used to assess position of the moving body.

In some embodiments, a zoom actuator system includes a fixed chassis structure and a moving carriage body. In some embodiments, the moving carriage body carries one or more lenses. In some embodiments, the moving carriage body is movably mounted to the chassis structure so as to limit degrees of freedom of movement of the moving carriage body to one or more allowed degrees of freedom. An inertial actuator is mounted to the moving carriage body in an alignment such that the axis of motion of the actuator is parallel to at least one of the one or more allowed degrees of freedom. An inertial mass is mounted to the inertial actuator on a side opposite the carriage body.

Some embodiments further include a driver circuit mounted on the moving carriage body, and a position sensor, mounted on the moving carriage body, for determining a position of the moving carriage body, such that the position sensor is connected to the driver circuit for reporting position information to the driver circuit. In some embodiments, the inertial actuator comprises a piezoelectric actuator.

In some embodiments, the moving carriage body contacts the chassis at datum surfaces of the moving carriage body to generate a friction force between the moving carriage body and the multiple conductive tracks as a result of magnetic force.

In some embodiments, the system further includes a driver circuit mounted on the moving carriage body, and a capacitive position sensor, mounted on the moving carriage body, for determining a position of the moving carriage body based on a plate capacitance between a plate of the position sensor and a metal pattern track on the chassis.

Some embodiments further include a method for operating a zoom actuator. In some embodiments, the method includes applying a first voltage to an inertial actuator attached to a moveable lens carriage body. In some embodiments, the inertial actuator is a piezoelectric element, and the first voltage causes an expansion of the piezoelectric element. In some embodiments, the method further includes applying a second voltage to the inertial actuator attached to a moveable lens carriage body. In some embodiments, the second voltage causes a contraction of the piezoelectric element, and the contraction is slower than the expansion.

In some embodiments, the method further includes applying a third voltage to an inertial actuator attached to a moveable lens carriage body. In some embodiments, the third voltage causes a contraction of the piezoelectric element. In some embodiments, the method further includes applying a fourth voltage to the inertial actuator attached to a moveable lens carriage body. The fourth voltage causes an expansion of the piezoelectric element, and the expansion is slower than the contraction.

In some embodiments, the method further includes measuring a position of the moveable lens carriage body using a sensor attached to the moveable lens carriage body. In some embodiments, the applying a first voltage and the applying a second voltage further include driving an inertial actuator attached to the moveable lens carriage body with an asymmetric oscillatory electrical signal so that in one half of the cycle the inertial acceleration is higher than in the other.

In some embodiments, the applying a first voltage and the applying a second voltage further include driving an inertial actuator attached to the moveable lens carriage body with an asymmetric oscillatory electrical signal so that in one half of the cycle the inertial acceleration is higher than in the other such that, during at least a portion of the oscillatory motion, inertial forces generated by the inertial actuator exceed a magnetically-induced friction between the moving carriage body and the chassis structure to cause sliding in an allowed linear degree of freedom.

In some embodiments, the applying a first voltage and the applying a second voltage further include driving an inertial actuator attached to the moveable lens carriage body with an asymmetric oscillatory electrical signal having a sawtooth waveform.

In some embodiments, the method further includes driving an inertial actuator attached to a second moveable lens carriage body with an asymmetric oscillatory electrical signal so that in one half of the cycle the inertial acceleration is higher than in the other such that the second moveable lens carriage body moves with respect to the first moveable lens carriage body.

Some embodiments include a means for controlling a zoom actuator of a camera, as described herein. For example, a camera control module may drive an inertial actuator attached to the moveable lens carriage body with an asymmetric oscillatory electrical signal so that in one half of the cycle the inertial acceleration is higher than in the other, as described herein. The camera control module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform driving an inertial actuator attached to the moveable lens carriage body with an asymmetric oscillatory electrical signal so that in one half of the cycle the inertial acceleration is higher than in the other, as described herein. Other embodiments of the camera control module may be at least partially implemented by hardware circuitry and/or firmware stored, for example, in a non-volatile memory.

Some embodiments include an actuator system, which includes a moveable carriage that slides along surfaces of a fixed support structure. In some embodiments the contact surfaces between the moveable carriage and the fixed support structure collectively substantially constrain five degrees of freedom of motion of the moveable carriage, and the remaining sixth degree of freedom represents linear motion of the moveable carriage along an axis relative to the fixed support structure. In some embodiments the motion is limited by friction between the moveable carriage and the fixed support structure that is generated as a result of magnetic force. In some embodiments the contact forces that generate the friction forces are themselves generated by magnets or electromagnets mounted to the moveable carriage that contacts a further surface of the fixed support structure, and the motion of the moveable carriage relative to the fixed support structure is controlled by the operation of an inertial actuator mounted on the moveable carriage. In some embodiments, the inertial actuator includes a linear actuator with direction of motion parallel to the movement axis, fixed at one end to the moveable carriage and at the other to an inertial mass.

In some embodiments, the inertial actuator is driven with an asymmetric oscillatory electrical signal so that in one part of the cycle the inertial acceleration of the moveable carriage is higher than in another, and during at least a portion of the oscillatory motion, the inertial forces exceed the static friction of the frictional contacts between the moveable carriage and the fixed support structure and cause sliding in the allowed linear degree of freedom. In combination, multiple such oscillatory cycles yield a net motion of the moveable carriage in one direction relative to the fixed support structure, and the reverse motion can be achieved by appropriately altering the asymmetric electrical signal.

In some embodiments, the programmable driver circuit for the inertial actuator is also mounted on the moveable carriage, and at least four electrical signals are supplied to the moveable carriage, two being electrical power terminals and two being communication terminals to command a desired motion.

In some embodiments, multiple moveable carriages and inertial actuators operate independently along the same guide surfaces of the fixed support structure. In some embodiments, the moveable carriage is used to move one or more optical elements of a miniature camera, such that the axis of motion of the moveable carriage is parallel to the optical axis of the one or more optical elements.

In some embodiments, the inertial actuator includes a piezoelectric element that represents the linear actuator attached to an inertial mass. In some embodiments, capacitive position sensors detect the capacitance between an electrode mounted on the moveable carriage and a patterned electrode mounted on the fixed support structure in such a way that the capacitance varies depending on the position of the moveable carriage.

In some embodiments, the electrode pattern forms an oscillatory pattern along the direction of motion, such that the measured capacitance oscillates as the moveable carriage moves along the axis of motion in a given direction, so that a coarse measure of position from a given home position is determined by counting the number of oscillatory cycles, and a fine measure of position is determined by the actual measured capacitance within one oscillatory cycle of capacitance.

Some embodiments include an actuator system for a moveable carriage that slides along surfaces of a fixed support structure. In some embodiments, the contact surfaces between the moveable carriage and the fixed support structure collectively substantially constrain up to five degrees of freedom of motion of the moveable carriage, and the remaining sixth degree of freedom represents linear motion of the moveable carriage along an axis relative to the fixed support structure. In some embodiments, the motion is limited by friction between the moveable carriage and the fixed support structure.

In some embodiments the contact forces that generate the friction forces are themselves generated by a magnetic portion of the moveable carriage that interacts with a further magnetic surface of the fixed support structure. In some embodiments, the motion of the moveable carriage relative to the fixed support structure is controlled by the operation of an inertial actuator mounted on the moveable carriage, which includes linear actuator with direction of motion parallel to the movement axis, fixed at one end to the moveable carriage and at the other to an inertial mass. In some embodiments, separate electrical connection means is provided to the moveable carriage to electrically drive the inertial actuator as appropriate to generate the desired motion.

In some embodiments, the inertial actuator is driven with an asymmetric oscillatory electrical signal so that in one part of the cycle the inertial acceleration of the moveable carriage is higher than in another, and during at least a portion of the oscillatory motion, the inertial forces exceed the static friction of the frictional contacts between the moveable carriage and the fixed support structure and cause sliding in the allowed linear degree of freedom. In combination, multiple such oscillatory cycles yield a net motion of the moveable carriage in one direction relative to the fixed support structure, and wherein the reverse motion can be achieved by appropriately altering the asymmetric electrical signal.

In some embodiments, the programmable driver circuit for the inertial actuator is also mounted on the moveable carriage, and at least four electrical signals are supplied to the moveable carriage, two being electrical power terminals and two being communication terminals to command a desired motion. In some embodiments, plural such moveable carriages and inertial actuators operate independently along the same guide surfaces of the fixed support structure.

In some embodiments, the moveable carriage is used to move one or more optical elements of a miniature camera, such that the axis of motion of the moveable carriage is parallel to the optical axis of the one or more optical elements. In some embodiments, the inertial actuator includes a piezoelectric element that is a linear actuator attached to an inertial mass.

In some embodiments, the one or more magnets include one or more electrically controllable magnets, and the moveable carriage body receives power and control signals to the inertial actuator and the one or more magnets through a flexible printed circuit configured to coil behind and unwind beneath the moveable carriage body during movement.

In some embodiments, the method further includes generating a magnetic attraction force between a moveable lens carriage body and a fixed chassis structure from magnets mounted to the moveable lens carriage body. In some embodiments the moveable carriage body is controllably held in place with respect to at least one allowed degree of freedom by one or more friction forces resulting from the magnetic attraction force between the one or more magnets and a magnetic friction track of the moveable carriage structure further includes In some embodiments, the method further includes generating a magnetic attraction force between a moveable lens carriage body and a fixed chassis structure by applying a second voltage to one or more electrically controllable magnets mounted to the moveable lens carriage body. In some embodiments, the moveable carriage body is controllably held in place with respect to at least one allowed degree of freedom by one or more friction forces resulting from the magnetic attraction force between the one or more electrically controllable magnets and a magnetic friction track of the moveable carriage structure.

Introduction to Piezoelectric Materials

The piezoelectric effect is understood as the linear electromechanical interaction between the mechanical and the electrical state in crystalline materials with no inversion symmetry. The piezoelectric effect is a reversible process in that materials exhibiting the direct piezoelectric effect (the internal generation of electrical charge resulting from an applied mechanical force) also exhibit the reverse piezoelectric effect (the internal generation of a mechanical strain resulting from an applied electrical field). For example, lead zirconate titanate crystals will generate measurable piezoelectricity when their static structure is deformed by about 0.1% of the original dimension. Conversely, those same crystals will change about 0.1% of their static dimension when an external electric field is applied to the material.

A piezoelectric actuator converts an electrical signal into a precisely controlled physical displacement (stroke). If displacement is prevented, a useable force (blocking force) will develop. The precise movement control afforded by piezoelectric actuators is used to finely adjust machining tools, lenses, mirrors, or other equipment. Piezoelectric actuators are also used to control hydraulic valves, act as small-volume pumps or special-purpose motors, and in other applications requiring movement or force.

Multifunction Device

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

Attention is now directed toward embodiments of portable devices with cameras. FIG. 1A is a block diagram illustrating portable multifunction device 100 with camera 164 in accordance with some embodiments. Camera 164 is sometimes called an "optical sensor" for convenience, and may also be known as or called an optical sensor system or zoom camera system. Device 100 may include memory 102 (which may include one or more computer readable storage mediums), memory controller 122, one or more processing units (CPU's) 120, peripherals interface 118, RF circuitry 108, audio circuitry 110, speaker 111, touch-sensitive display system 112, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors or cameras 164, which may include zoom actuators as described herein. FIG. 1A shows an optical sensor coupled to optical sensor controller 158 in I/O subsystem 106.

Optical sensor 164 may include charge-coupled device (CCD) or complementary metal-oxide semiconductor (CMOS) phototransistors.

Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers.

The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1A shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

Figure 3:
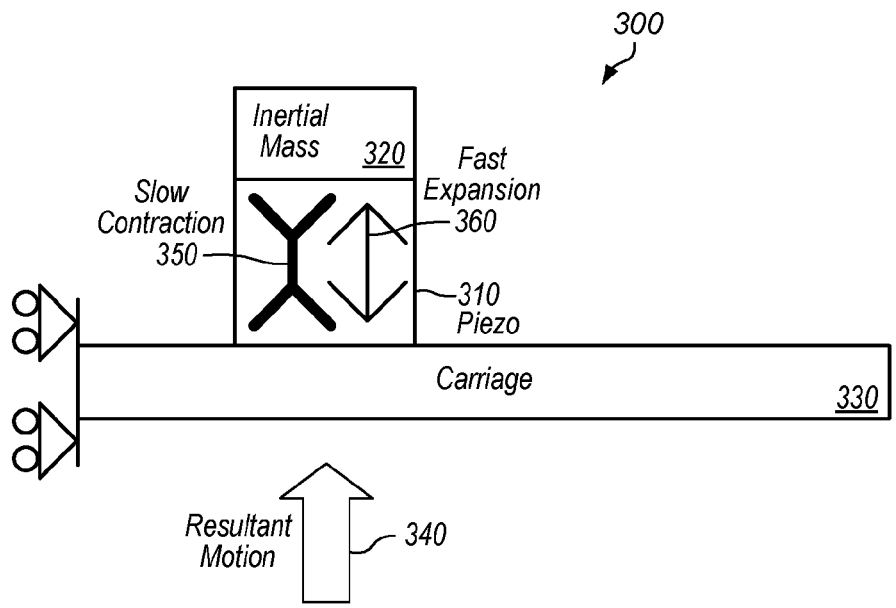
FIG. 3 depicts schematic operation of an inertial actuator, according to some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, arbiter module 157 and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102. Some embodiments of camera module 143 include instructions for control of a zoom lens actuator, as described herein.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 2:
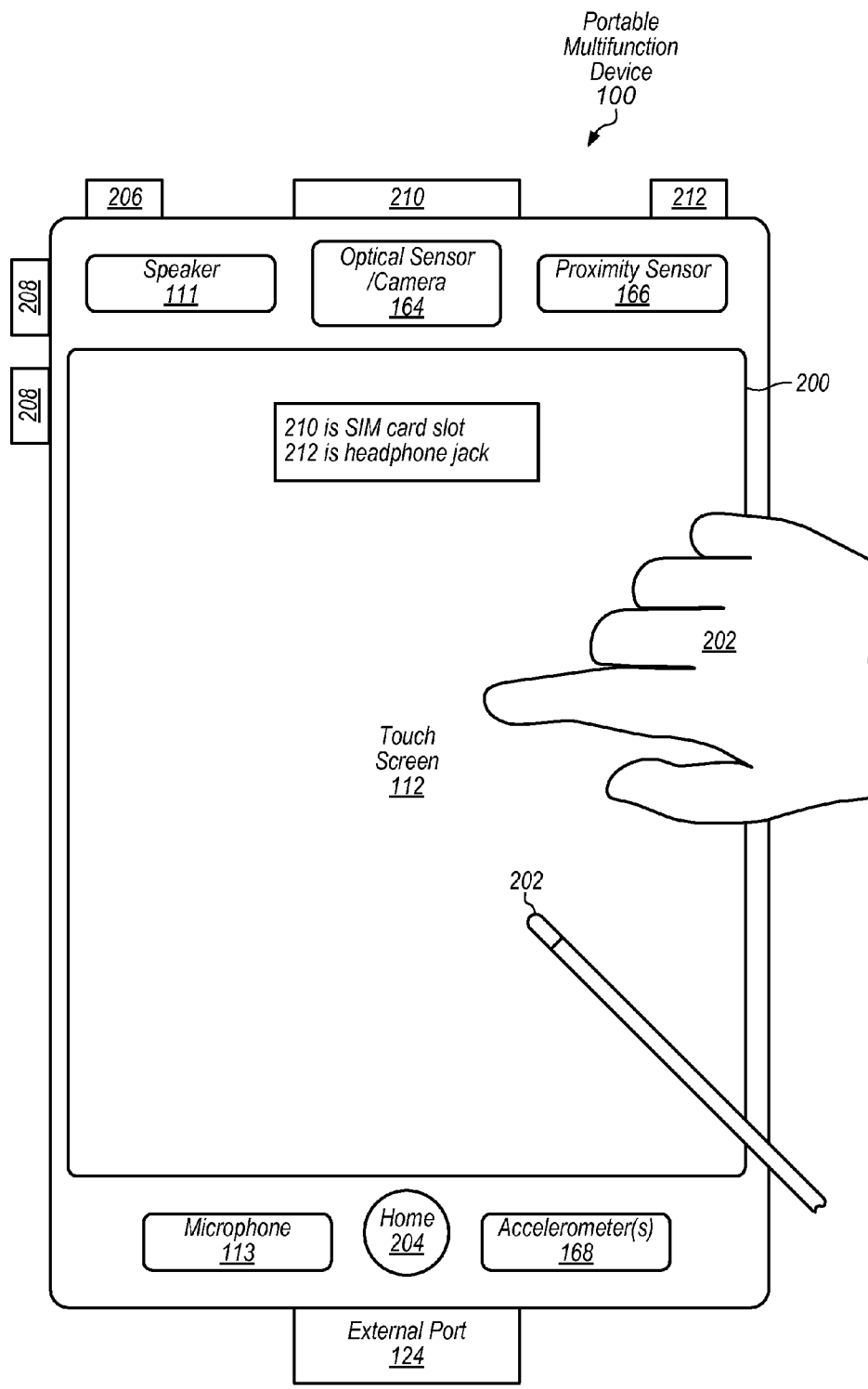
FIG. 2 depicts a portable multifunction device having a camera in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the following examples will be given with reference to optical sensor/camera 164 on the front of a device such as a tablet computer or telephone, a rear-facing camera or optical sensor that is pointed opposite from the display may be used instead of optical sensor/camera 164 on a front surface. Other portable electronic devices, such as laptops or tablet computers with cameras, may also be used. It should also be understood that, in some embodiments, the device is not a portable communications device, but is a desktop or laptop computer with a camera. In some embodiments, the device is a gaming computer with cameras (e.g., in a gaming controller). It should also be noted that the terms moving and movable are used interchangeably herein.

Zoom Actuator Mechanism

Some embodiments provide a zoom actuator system. In some embodiments, a moving body slides on a fixed chassis structure. In some embodiments, the fixed chassis structure substantially limits the motion of the moving body to one linear degree of freedom.

Some embodiments minimize the number of components in the tolerance stack between lens groups, and reduce or eliminate clearances that can cause an uncertainty in position of the lens groups, such as may be observed with a change in camera orientation.

Unlike other miniature camera actuator mechanisms, such as for auto-focus (AF) and Optical Image Stabilization (OIS), the movement of the different lens groups tends much greater, when normalized with for example the image sensor size, with the result that it is frequently impractical to use an arrangement of resilient flexures to suspend the moving lens group and guide its motion, and some friction is generated as each lens group is slid up and down some kind of guide structure.

Friction creates issues such as wear and positional accuracy, but some embodiments employ the presence of friction to provide some useful features. In some embodiments, the friction is designed to be great enough to support the weight of the lens group and moving portion of the mechanism. Thus, in some embodiments, once positioned, the actuator consumes less power to maintain position. Some embodiments are designed such that an arrangement of magnets is used to generate the normal contact load between the moving portion and fixed guide structure, such that some clearances can be eliminated improving positional accuracy of the lens group.

In some embodiments, the only contact between the moving portion and the fixed structure of the actuator is through the frictional interface, which makes the actuator much more robust against very high external accelerations, such as those very high external accelerations experienced, for example, when the multifunction device is dropped onto the floor. In some embodiments, one class of actuator mechanisms involves an actuator (for example a motor) mounted on the fixed portion of the actuator, and then a drive train (for example a leadscrew and nut) to convert this motion to a linear motion of the lens group. In some embodiments, the actuator is designed to achieve the driving force through the frictional contact surfaces, such that high accelerations result in slippage of the moving portion on its guide structure, rather than high loads that might otherwise damage components.

In some embodiments, the same fixed guide structures are used for plural moving portions that can move independently. In some embodiments, the presence and use of friction means that positional accuracy is less certain, and hence a position sensing means is incorporated for each moving portion.

Non-limiting embodiments of the present invention will now be presented with the aid of the accompanying illustrations. In some embodiments, the basic operation of the actuator is to use piezo (piezoelectric element) as an inertial exciter. FIG. 3 depicts schematic operation of an inertial actuator, according to some embodiments. An actuator assembly 300 includes a piezo 310 situated between an inertial mass 320 and a moving body 330. Motion 340 of moving body 330 is generated by slowly contracting 350 and quickly expanding 360 piezo 310.

Figure 4:
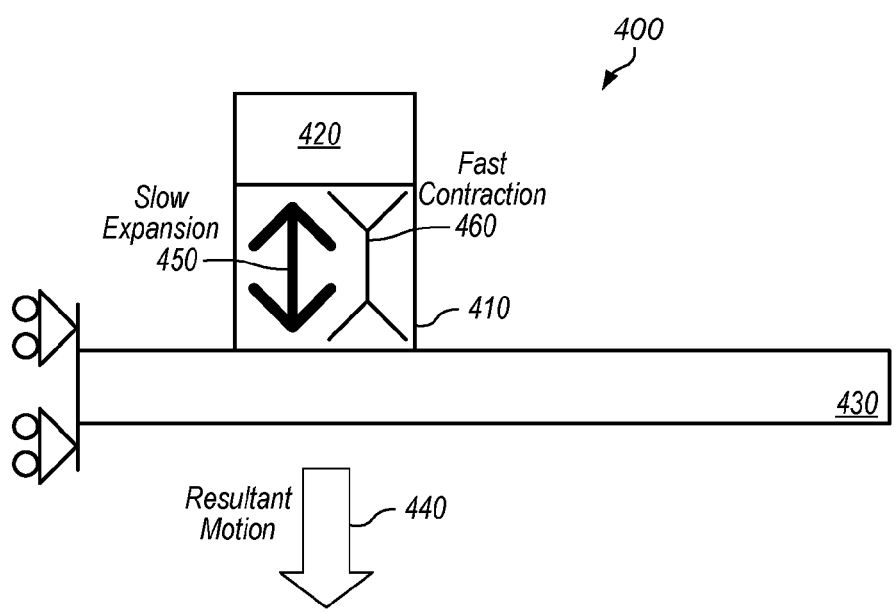
FIG. 4 illustrates schematic operation of an inertial actuator, according to some embodiments.

FIG. 4 illustrates schematic operation of an inertial actuator, according to some embodiments. An actuator assembly 400 includes a piezo 410 situated between an inertial mass 420 and a moving body 430. Motion 440 of moving body 430 is generated by slowly expanding 450 and quickly contracting 460 piezo 410. On one side, piezo 410 is joined to moving body 430, which may include a lens group of a zoom lens apparatus. On the other side is inertial mass 420. By dynamically deforming the shape of piezo 410 in response to applied voltages, piezo 410 accelerates inertial mass 420. The inertial forces for motion 440 are transmitted to the moving body 430.

Figure 5:
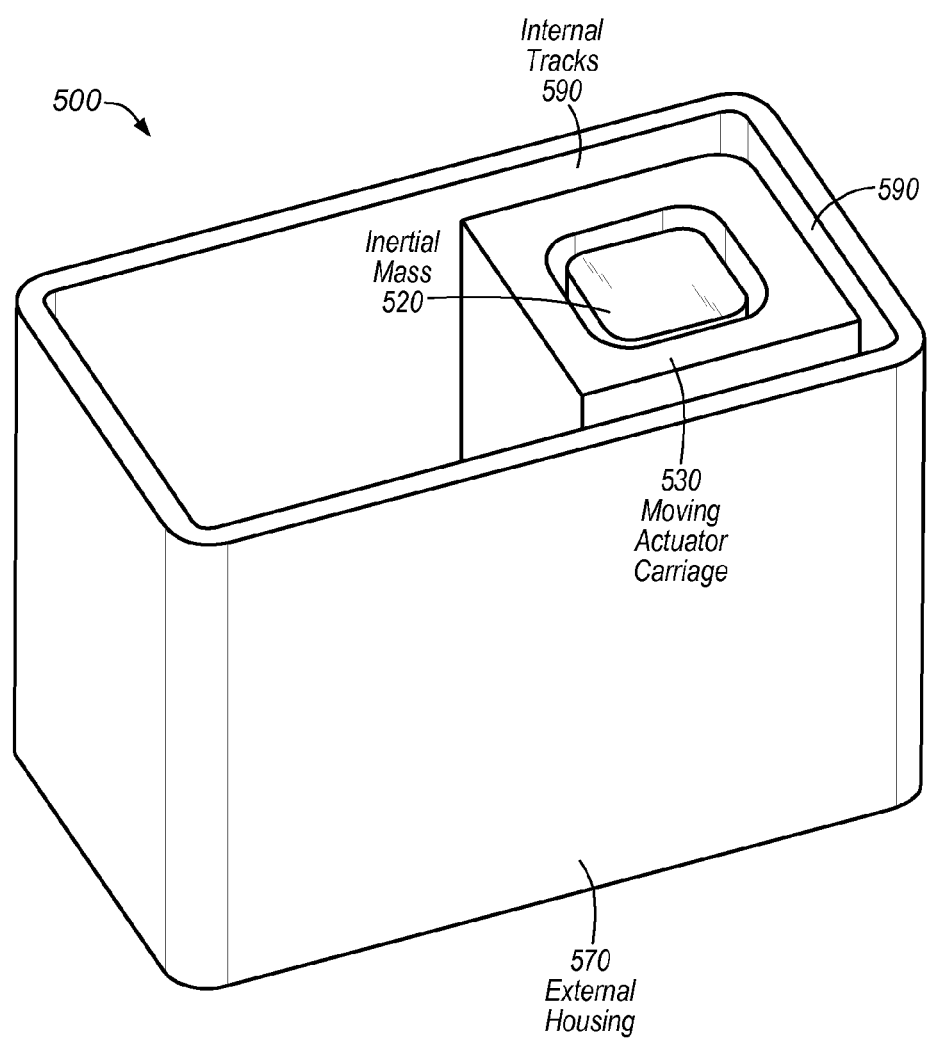
FIG. 5 illustrates a long-throw actuator assembled with its housing, according to some embodiments.

FIG. 5 illustrates a long-throw actuator assembled with its housing, according to some embodiments. A zoom actuator system 500 includes a chassis (external housing 570). In some embodiments, the external housing is composed of a magnetic material, such as a magnetic steel, to which a moving actuator carriage 530 is articulated. Moving actuator carriage 530 is, in some embodiments, formed from a non-magnetic material, such as aluminum. Though not visible in the embodiment shown in FIG. 5, in some embodiments a second independent moving actuator carriage 580 is also included. Embodiments vary the length of chassis 570 to fit particular needs. Two sides of the chassis form contact surfaces (tracks 590), which provide substantially rigid contact surfaces for moving actuator carriage 530.

Chassis 570 provides a structure that can guide the moving actuator carriage 530 along the degree of freedom of interest, which in the case of the zoom actuator 500 is parallel to the optical axis. Moving actuator carriage 530 also contains one or more magnets (not shown in FIG. 5), to provide an appropriate normal preload force on all the contact surfaces (e.g. internal tracts 590) between the moving actuator carriage 530 and chassis 570. In this way there is a friction force between the between the moving actuator carriage 530 and chassis 570.

The size of the piezo (not visible in FIG. 5) and inertial mass 520 are chosen such that inertial acceleration forces can overcome the static friction. If driven with a sine wave, which is symmetric, then in the nominal case over time, there will be no net movement. However if the oscillatory waveform is asymmetric, then it can be arranged that in one direction, the inertial forces can overcome the static friction, whilst in the other direction, they are essentially lower and in the ideal case there is no reverse motion. In this way, over multiple cycles, the between the moving actuator carriage 530 and can work its way along chassis 570

In the configuration shown in FIG. 5, some embodiments transmit electrical signals to the piezo (not visible in FIG. 5) on the moving actuator carriage 530 using a ribbon connector or flexible printed circuit (not shown). In some embodiments, a driver integrated circuit (IC) (not shown) for the piezo (not shown) is also mounted on the moving actuator carriage 530, and digital communication to the driver IC to request a movement is routed via the ribbon connector or flexible printed circuit (not shown). In some embodiments, a convenient communication protocol is I²C, which uses two terminals. I²C is a multi-master serial single-ended computer bus used for attaching low-speed peripherals to a motherboard. In some embodiments, I²C uses two bidirectional open-drain lines, a Serial Data Line (SDA) and a Serial Clock (SCL), pulled up with resistors. Typical voltages used are +5 V or +3.3 V although systems with other voltages are permitted.

The I²C reference design has a 7-bit or a 10-bit (depending on the device used) address space. Common I²C bus speeds are the 100 kbit/s standard mode and the 10 kbit/s low-speed mode, but arbitrarily low clock frequencies are also allowed. Recent revisions of I²C can host more nodes and run at faster speeds (400 kbit/s Fast mode, 1 Mbit/s Fast mode plus or Fm+, and 3.4 Mbit/s High Speed mode). These speeds are more widely used on embedded systems than on PCs. There are also other features, such as 16-bit addressing.

In addition, in some embodiments the driver IC uses two power terminals (typically power and ground). Therefore for this configuration, there are four electrical terminals used by the moving actuator carriage 530. Some embodiments allow multiple moving bodies (e.g., moving actuator carriage 530 and a second independent moving actuator carriage) to be running on the same tracks 590, by ensuring the driver ICs on moving actuator carriage 530 and second independent moving actuator carriage have different I²C addresses, and hence may communicate on the same I²C bus. Such embodiments allow a lens of a second independent moving actuator carriage to be moved relative to a lens in a lens group mounting feature of moving actuator carriage 530. A hall sensor or (in alternative embodiments a capacitive position sensing pattern allows the position of each of moving actuator carriage 530 and the second independent moving actuator carriage to be independently measured.

Figure 6:
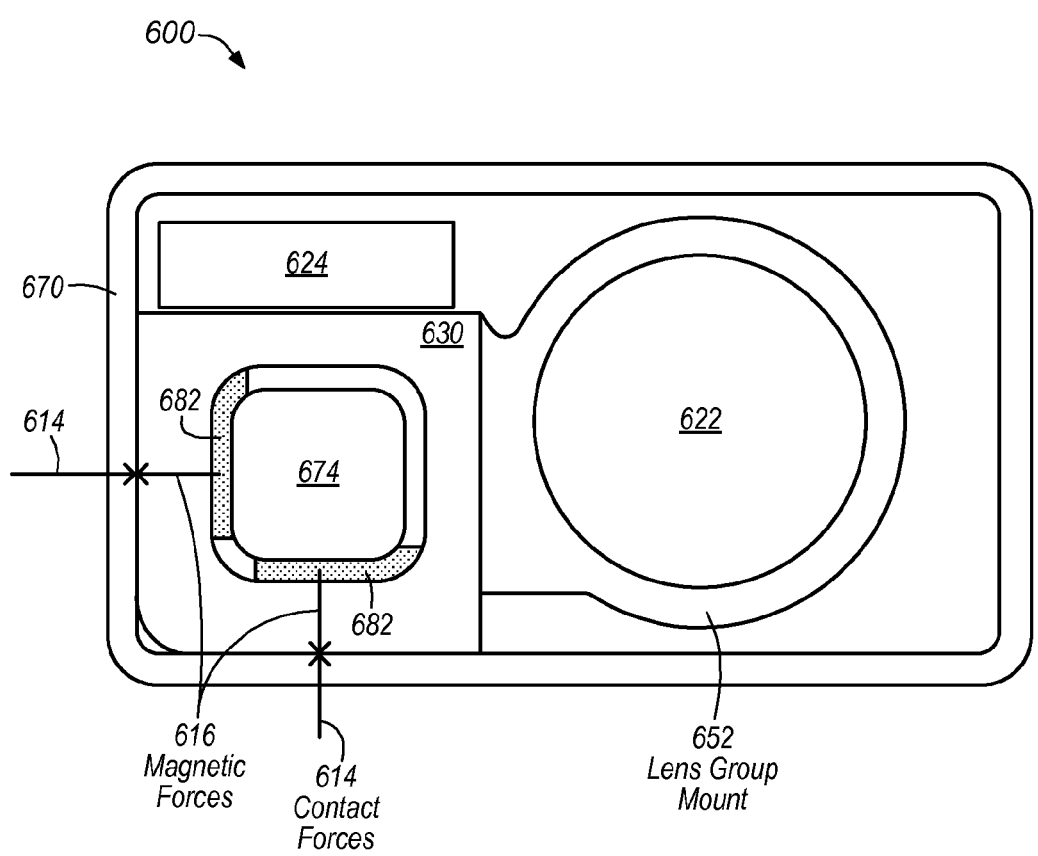
FIG. 6 depicts a long-throw actuator assembled with its housing, according to some embodiments.

FIG. 6 depicts a long-throw actuator assembled with its housing, according to some embodiments. A zoom actuator system 600 includes a chassis 670, to which a moving actuator carriage 630 is articulated. A lens group mount 652 for carrying one or more lenses 622 is shown within the moving actuator carriage 630 of zoom actuator assembly 600. Chassis 670 provides a structure that guides the moving actuator carriage 630 along the degree of freedom of interest.

Moving actuator carriage 630 contains one or more magnets 682, to provide an appropriate normal preload force (magnetic forces 616) in opposition to contact forces 614 between the moving actuator carriage 630 and chassis 670. In this way there is a friction force between the between the moving actuator carriage 630 and chassis 670. The piezo is not visible, but an inertial mass 674 mounted to the piezo is shown. A driver circuit 624 is also shown.

In some embodiments, the carriage 630 in the chassis structure 670, and the direction of the contact forces 614 on the carriage 630 are shown. In some embodiments, relative to the image sensor (not shown), the carriage 630 in principle has six degrees of freedom; three orthogonal linear directions, and rotations about three orthogonal axes. The degree of freedom used for is movement in or out of the page as viewed in FIG. 6, which is parallel with the optical axis for a typical zoom lens 622 configuration.

Figure 7:
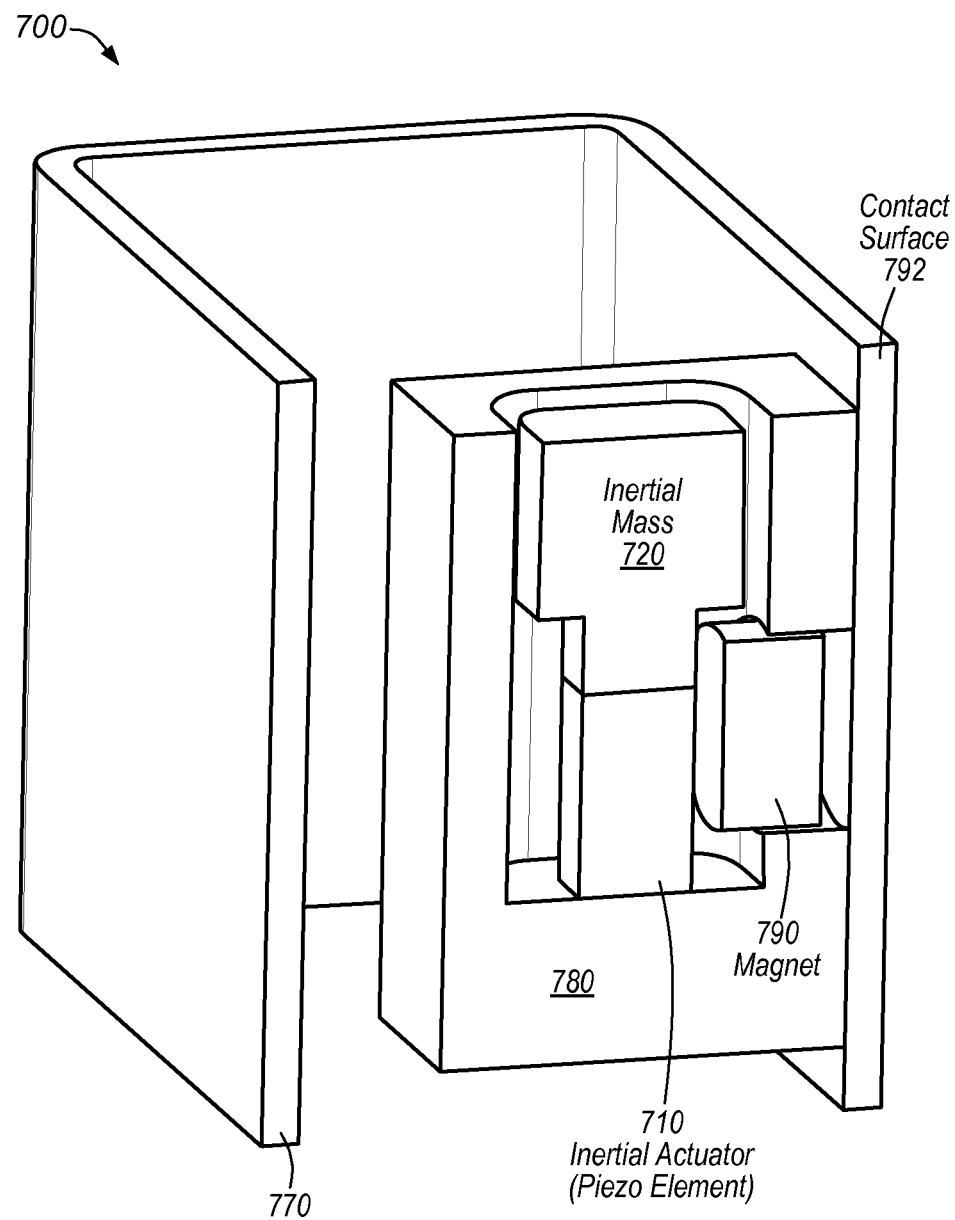
FIG. 7 illustrates a cutaway view of a long-throw actuator assembled with its housing, according to some embodiments.

FIG. 7 illustrates a cutaway view of a long-throw actuator assembled with its housing, according to some embodiments. A zoom actuator system 700 includes a fixed chassis structure 770. In some embodiments, the fixed chassis structure 770 includes a magnetic friction track at a contact surface 792. In some embodiments, a moveable carriage body 780 carries one or more lenses (not shown in FIG. 7, but an example lens mount group 652 for carrying one or more lenses 622 is visible in FIG. 6). One or more magnets 790 is mounted to the moveable carriage body 780. In some embodiments, the moveable carriage body is movably mounted at contact surface 792 to the chassis 770 to allow movement along an optical axis through the one or more lenses (not shown in FIG. 7, but an example lens mount group 652 for carrying one or more lenses 622 is visible in FIG. 6).

In some embodiments, an inertial actuator 710 is mounted to the moveable carriage body 780 in an alignment such that the axis of motion of the actuator 710 is parallel to the optical axis through the one or more lenses (not shown in FIG. 7, but an example lens mount group 652 for carrying one or more lenses 622 is visible in FIG. 6). In some embodiments, the moveable carriage body 780 is held in place with respect to the at least one allowed degree of freedom by one or more friction forces at contact surface 792 resulting from the magnetic attraction force created by the one or more magnets 790.

In some embodiments, the moveable carriage body includes one or more datum surfaces, such as contact surface 792. In some embodiments, the datum surfaces serve as points of frictional contact between the moveable carriage and magnetic friction track. In some embodiments, the moveable carriage does not touch the fixed chassis structure except at the points of contact, such as contact surface 792, between the datum surfaces and the magnetic friction track.

In some embodiments, the fixed chassis structure 770 includes an external housing of non-magnetic material. In some embodiments, the magnetic friction track includes a strip of magnetic material.

Figure 8:
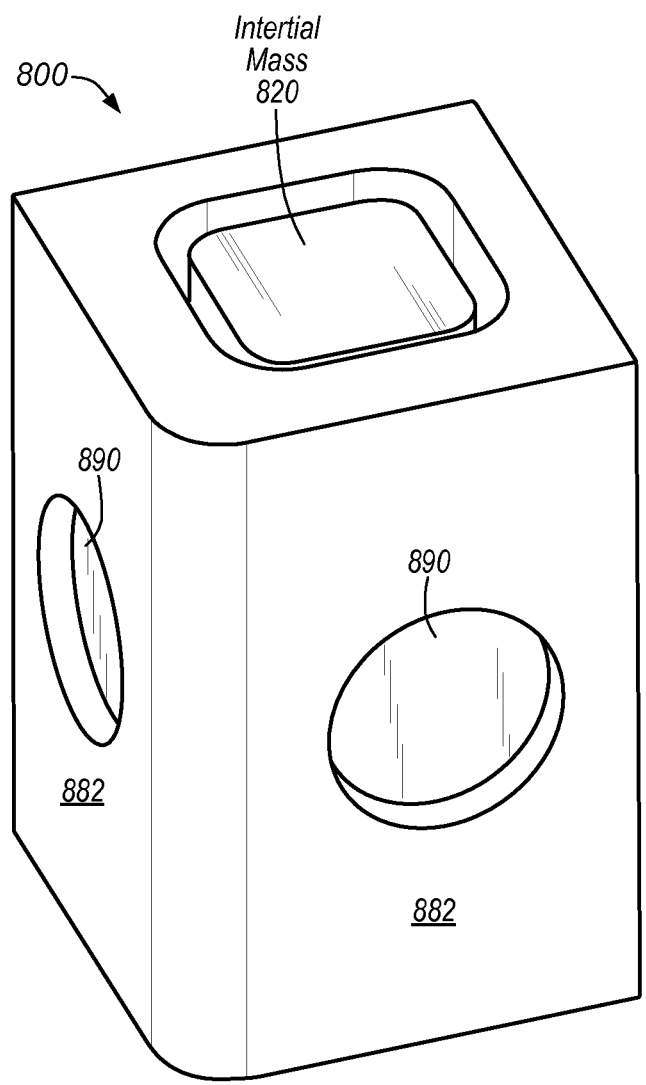
FIG. 8 depicts an actuator carriage without its housing, according to some embodiments.

FIG. 8 depicts an actuator carriage without its housing, according to some embodiments. A zoom actuator system includes a fixed chassis structure (not shown in FIG. 8). In some embodiments, the fixed chassis structure (not shown in FIG. 8) includes a magnetic friction track at a contact surface (not shown in FIG. 8) for meeting a contact surface 882 of a moveable carriage body 800. In some embodiments, the moveable carriage body 800 carries one or more lenses (not shown in FIG. 8, but an example lens mount group 652 for carrying one or more lenses 622 is visible in FIG. 6). One or more magnets 890 is mounted to the moveable carriage body 800. In some embodiments, the moveable carriage body 800 is movably mounted at contact surfaces 882 to the chassis (not shown in FIG. 8) to allow movement along an optical axis through the one or more lenses (not shown in FIG. 8, but an example lens mount group 652 for carrying one or more lenses 622 is visible in FIG. 6).

In some embodiments, an inertial actuator (not shown in FIG. 8) is mounted to the moveable carriage body 800 in an alignment such that the axis of motion of the actuator (not shown in FIG. 8) and an attached inertial mass 820 are parallel to the optical axis through the one or more lenses (not shown in FIG. 8, but an example lens mount group 652 for carrying one or more lenses 622 is visible in FIG. 6). In some embodiments, the moveable carriage body 800 is held in place with respect to the at least one allowed degree of freedom by one or more friction forces at contact surfaces 882 resulting from the magnetic attraction force created by the one or more magnets 890.

In some embodiments, the moveable carriage body includes one or more datum surfaces, such as contact surfaces 882. In some embodiments, the datum surfaces serve as points of frictional contact between the moveable carriage and magnetic friction track. In some embodiments, the moveable carriage does not touch the fixed chassis structure except at the points of contact, such as contact surface 882, between the datum surfaces and the magnetic friction track.

Figure 9:
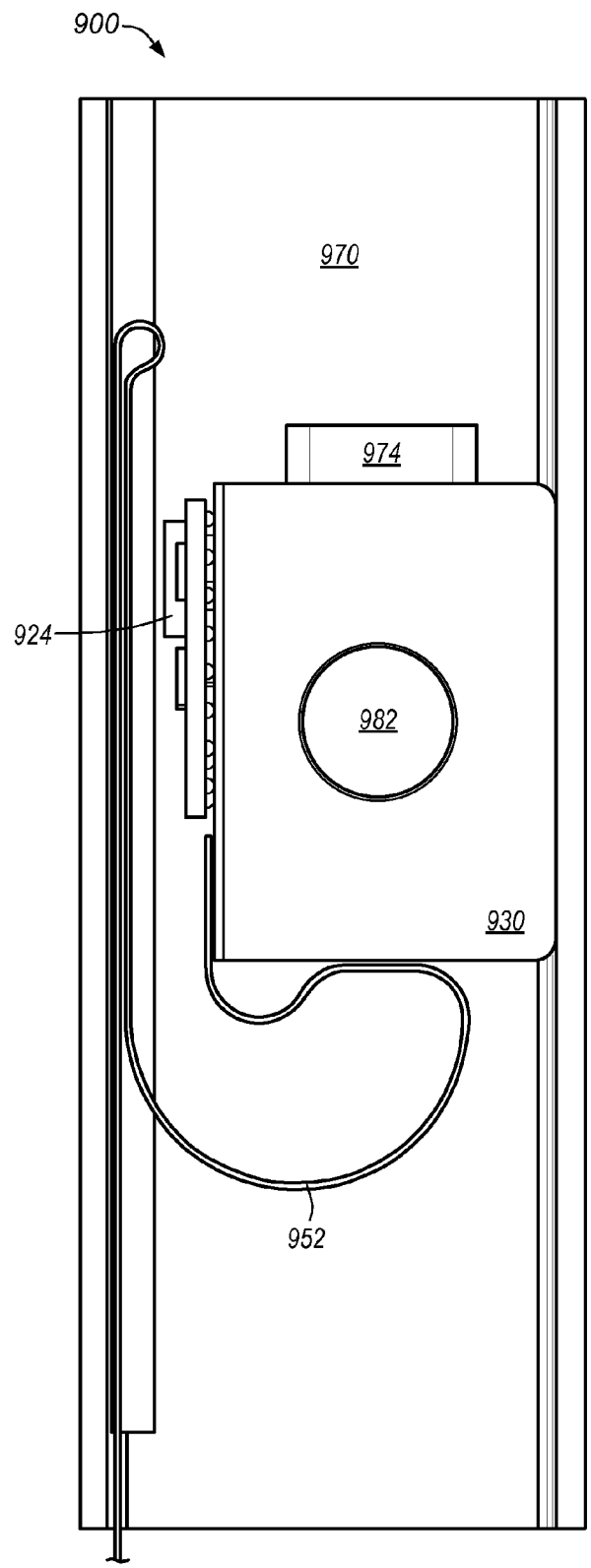
FIG. 9 illustrates carriage construction and connection features, according to some embodiments.

FIG. 9 illustrates carriage construction and connection features, according to some embodiments. A zoom actuator system 900 includes a chassis 970, to which a moving actuator carriage 930 is moveably articulated. Chassis 970 provides a structure that guides the moving actuator carriage 930 along the degree of freedom of interest.

Moving actuator carriage 930 contains one or more magnets 982, to provide an appropriate normal preload force (not shown in FIG. 9, but an example magnetic force is visible in FIG. 6 as magnetic forces 616) in opposition to contact forces (not shown in FIG. 9, but an example contact force is visible in FIG. 6 as contact forces 614) between the moving actuator carriage 930 and chassis 970. In this way there is a friction force between the between the moving actuator carriage 930 and chassis 970. The piezo is not visible, but an inertial mass 974 mounted to the piezo is shown. A driver circuit 924 is also shown.

In some embodiments, relative to the image sensor (not shown), the carriage 930 in principle has six degrees of freedom; three orthogonal linear directions, and rotations about three orthogonal axes. The degree of freedom used for is movement up and down the page as viewed in FIG. 9, which is parallel with the optical axis for a typical zoom lens configuration. In some embodiments, the moveable carriage body 930 receives power and control signals to the inertial actuator through a flexible printed circuit 952 configured to coil behind and unwind beneath the moveable carriage body 930 during movement.

Figure 10:
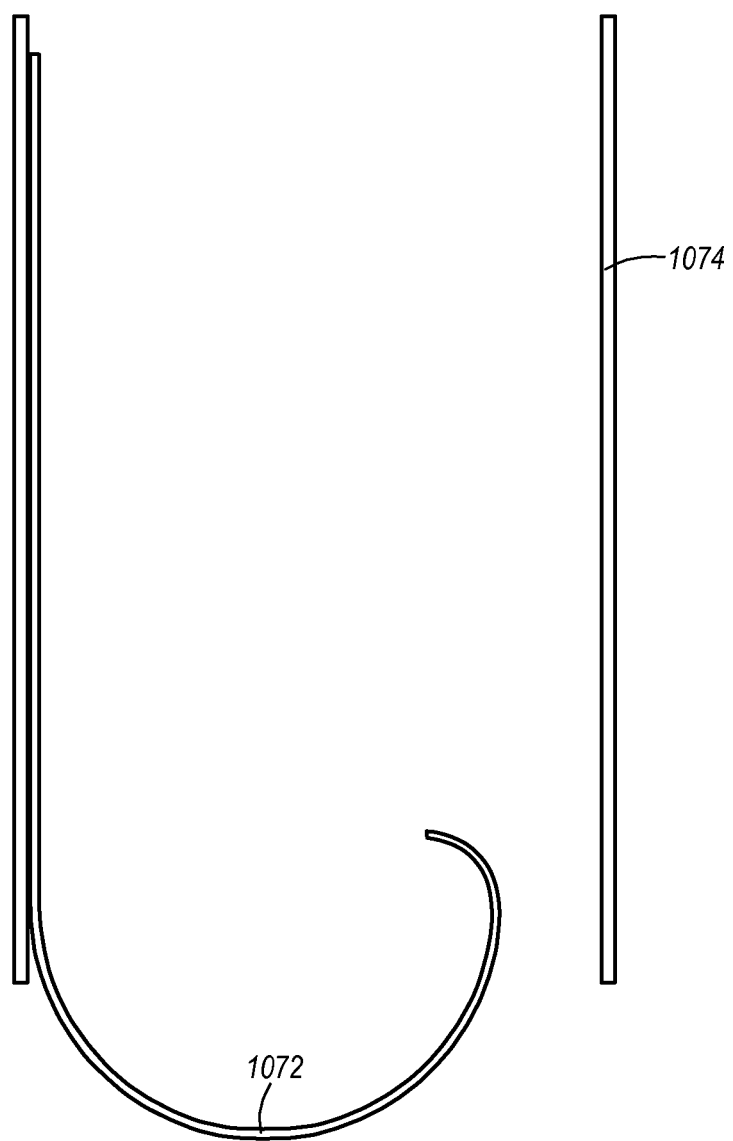
FIG. 10 depicts a carriage connector, according to some embodiments.

FIG. 10 depicts a carriage connector, according to some embodiments. In some embodiments, the moveable carriage body receives power and control signals to the inertial actuator through a flexible printed circuit configured to coil behind and unwind beneath the moveable carriage body during movement. In FIG. 10, an example flexible printed circuit is shown in a coiled state 1072 and a straightened state 1074.

FIG. 11 depicts a carriage and connector, according to some embodiments. In some embodiments, the driver circuit 1102 on the moveable carriage body receives power and control signals to the inertial actuator through a flexible printed circuit 1104 configured to coil behind and unwind beneath the moveable carriage body during movement.

FIG. 12 depicts a carriage and connector, according to some embodiments. In some embodiments, the driver circuit 1202 on the moveable carriage body receives power and control signals to the inertial actuator through a flexible printed circuit 1204 configured to coil behind and unwind beneath the moveable carriage body during movement.

Figure 13:
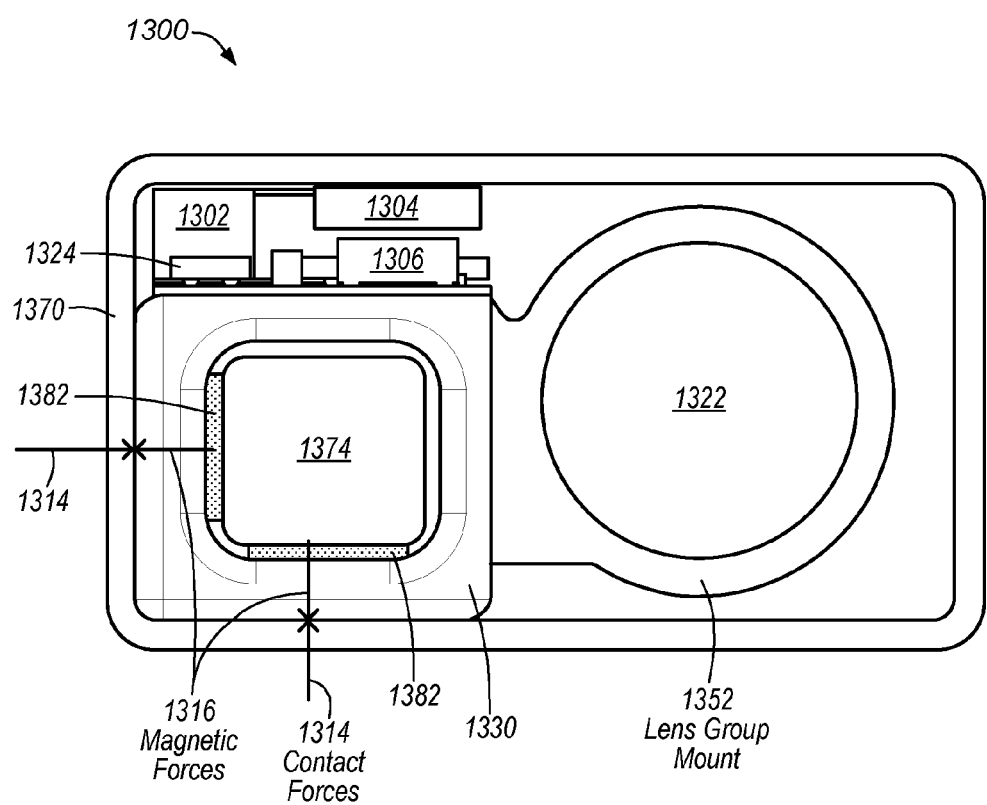
FIG. 13 illustrates a long-throw actuator assembled with its housing, according to some embodiments.

FIG. 13 illustrates a long-throw actuator assembled with its housing, according to some embodiments. A zoom actuator system 1300 includes a chassis 1370, to which a moving actuator carriage 1330 is articulated. A lens group mount 1352 for carrying one or more lenses 1322 is shown within the moving actuator carriage 1330 of zoom actuator assembly 1300. Chassis 1370 provides a structure that guides the moving actuator carriage 1330 along the degree of freedom of interest.

Moving actuator carriage 1330 contains one or more magnets 1382, to provide an appropriate normal preload force (magnetic forces 1316) in opposition to contact forces 1314 between the moving actuator carriage 1330 and chassis 1370. In this way there is a friction force between the between the moving actuator carriage 1330 and chassis 1370. The piezo is not visible, but an inertial mass 1374 mounted to the piezo is shown. A driver circuit 1324 is also shown. A position measurement track 1304 is shown, which may allow for capacitive or magnetic position measurements by a position sensor 1306, such as a Hall sensor or a capacitive sensor.

In some embodiments, the carriage 1330 in the chassis structure 1370, and the direction of the contact forces 1314 on the carriage 1330 are shown. In some embodiments, relative to the image sensor (not shown), the carriage 1330 in principle has six degrees of freedom; three orthogonal linear directions, and rotations about three orthogonal axes. The degree of freedom used for is movement in or out of the page as viewed in FIG. 13, which is parallel with the optical axis for a typical zoom lens 1322 configuration. In some embodiments, the driver circuit 1324 on the moveable carriage body receives power and control signals to the inertial actuator through a flexible printed circuit 1302 configured to coil behind and unwind beneath the moveable carriage body during movement.

Figure 14:
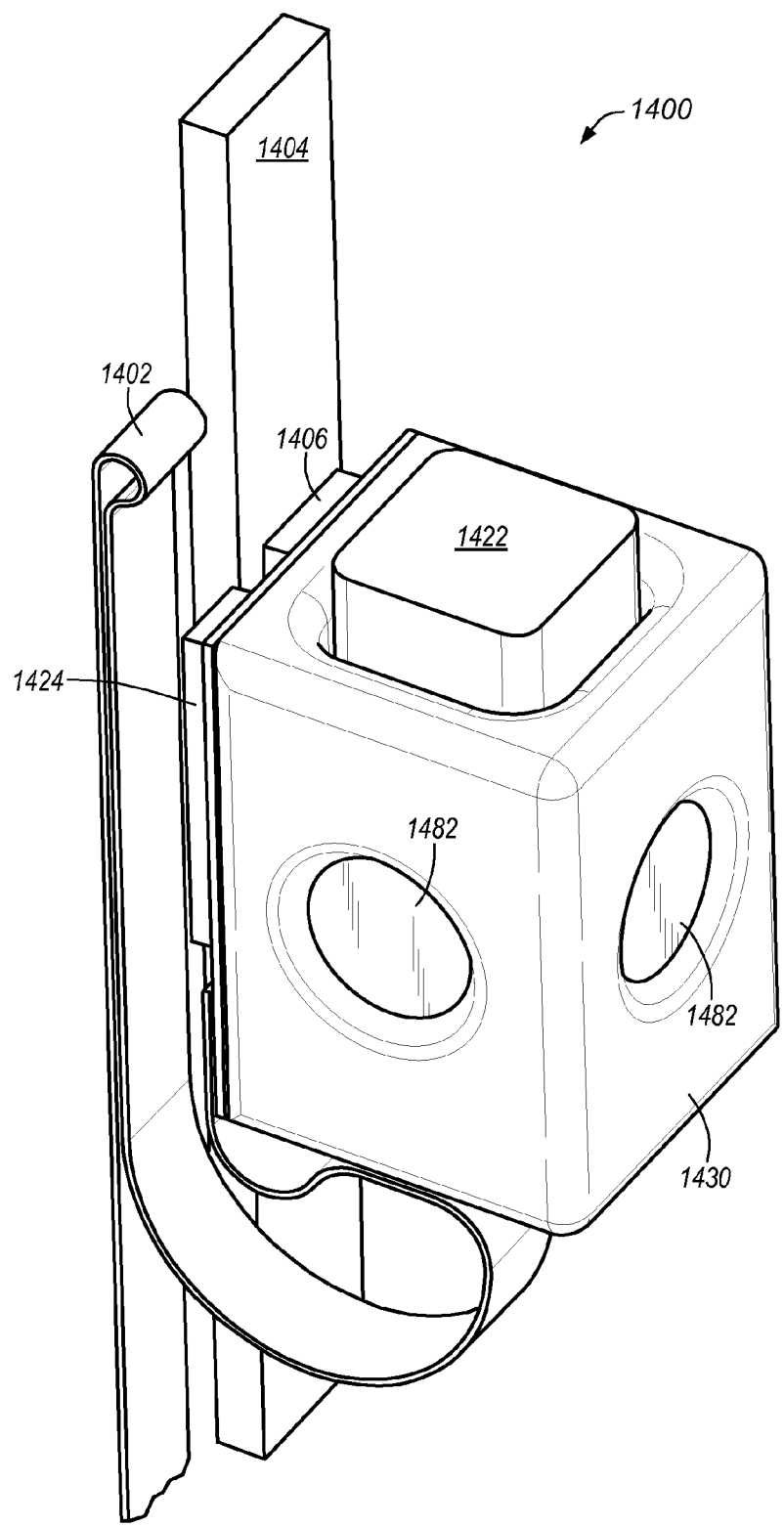
FIG. 14 depicts a carriage and connector, according to some embodiments.

FIG. 14 depicts a carriage and connector, according to some embodiments. A zoom actuator system 1400 includes a chassis (not shown in FIG. 14, but chassis 670 of FIG. 6 is one example), to which a moving actuator carriage 1430 is articulated. A lens group mount (not shown in FIG. 14, but an example lens mount group 652 for carrying one or more lenses 622 is visible in FIG. 6) for carrying one or more lenses attaches to moving actuator carriage 1430 of zoom actuator assembly 1400. Chassis (not shown in FIG. 14, but an example lens mount group 652 for carrying one or more lenses 622 is visible in FIG. 6) provides a structure that guides the moving actuator carriage 1430 along the degree of freedom of interest.

Moving actuator carriage 1430 contains one or more magnets 1482, to provide an appropriate normal preload force in opposition to contact forces between the moving actuator carriage 1430 and chassis. In this way there is a friction force between the between the moving actuator carriage 1430 and chassis. The piezo is not visible, but an inertial mass 1422 mounted to the piezo is shown. A driver circuit 1424 is also shown. A position measurement track 1404 is shown, which may allow for capacitive or magnetic position measurements by a position sensor 1406, such as a Hall sensor or a capacitive sensor.

In some embodiments, the driver circuit 1424 on the moveable carriage body receives power and control signals to the inertial actuator through a flexible printed circuit 1402 configured to coil behind and unwind beneath the moveable carriage body during movement.

Figure 15:
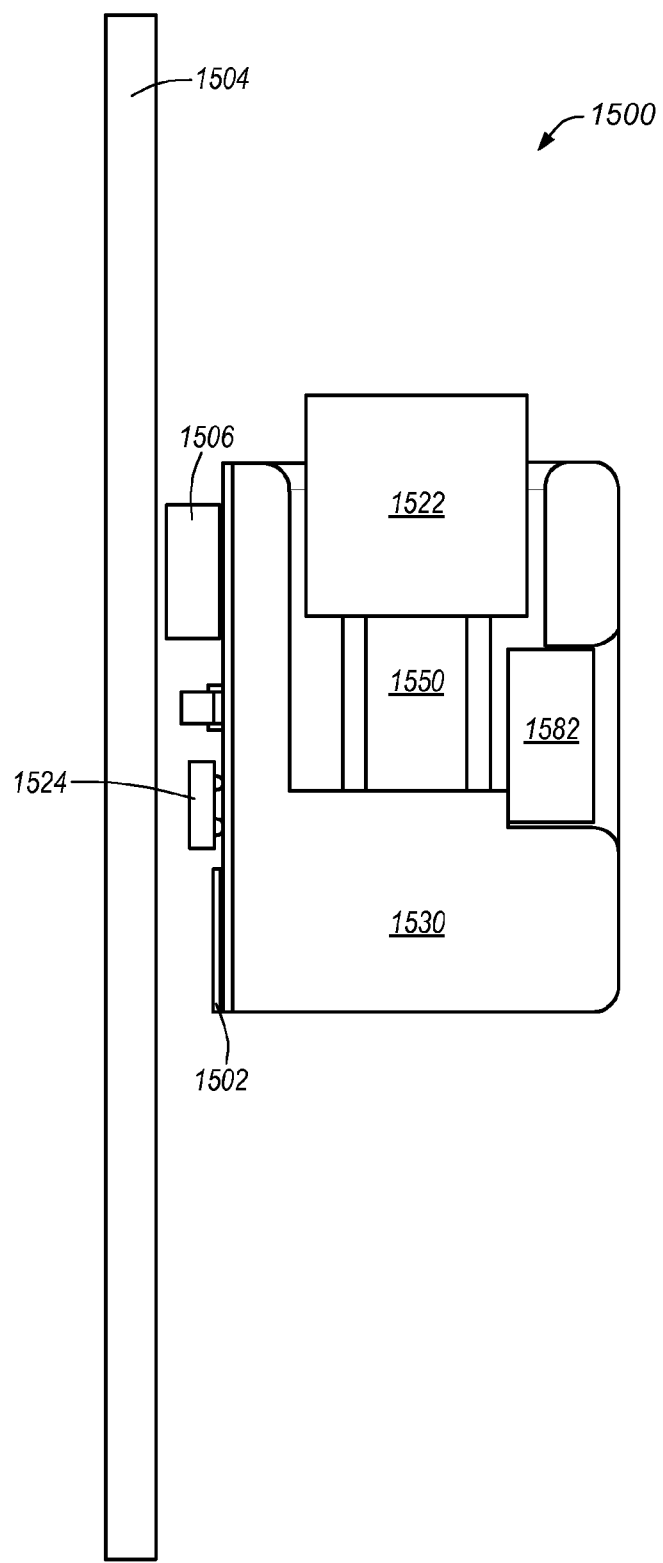
FIG. 15 illustrates a cutaway view of a long-throw actuator assembled with its housing, according to some embodiments.

FIG. 15 illustrates a cutaway view of a long-throw actuator assembled with its housing, according to some embodiments. A zoom actuator system 1500 includes a chassis (not shown in FIG. 15, but chassis 670 of FIG. 6 is one example), to which a moving actuator carriage 1530 is articulated. A lens group mount (not shown in FIG. 15, but an example lens mount group 652 for carrying one or more lenses 622 is visible in FIG. 6) for carrying one or more lenses attaches to moving actuator carriage 1530 of zoom actuator assembly

1500. Chassis (not shown in FIG. 15, but an example lens mount group 652 for carrying one or more lenses 622 is visible in FIG. 6) provides a structure that guides the moving actuator carriage 1530 along the degree of freedom of interest.

Moving actuator carriage 1530 contains one or more magnets 1582, to provide an appropriate normal preload force in opposition to contact forces between the moving actuator carriage 1530 and chassis. In this way there is a friction force between the between the moving actuator carriage 1530 and chassis. The piezo 1550 moves an inertial mass 1522 mounted to the piezo, to create a motive force (as shown in FIG. 15, up and down the page) to move moving carriage 1530 by overcoming friction forces between the chassis and moving carriage body 1530. A driver circuit 1524 is also shown. A position measurement track 1504 is shown, which may allow for capacitive or magnetic position measurements by a position sensor 1506, such as a Hall sensor or a capacitive sensor.

In some embodiments, the driver circuit 1524 on the moveable carriage body receives power and control signals to the inertial actuator through a flexible printed circuit 1502 configured to coil behind and unwind beneath the moveable carriage body during movement.

In some embodiments, there are several advantages to this basic approach. The inertial loads of the lens group in lens group mount are not taken by the piezo 1550, which increases robustness. In fact during an impact, the piezo 1550 only needs to take the loads of the inertial mass 1522, and its own self weight. The actuator (piezo element 1550) and carriage 1530 are only connected mechanically to the fixed chassis (not shown) via the contact surfaces (e.g., contact surface 792 of FIG. 7), such that there is not extra mechanical or electrical tethering. This absence of extra mechanical or electrical tethering aids robustness. Placing the driver IC 1524 on the carriage 1530 and providing the appropriate electrical connections via contacts FPC 1502 allows additional carriages, in some embodiments, to be mounted on the same chassis structure, minimizing size.

In some embodiments, position sensor 1506 is used required to control the position of the one or more carriages. In some embodiments, this is achieved by using a capacitance sensor, comprising a conductive plate mounted to the carriage 1530 to form a capacitive coupling to a patterned conductive trace on the chassis structure. This trace may ultimately be connected to ground or some other terminal to provide the complete circuit around the capacitor. In some embodiments the shape of this pattern that the effective size of the parallel plate capacitor formed by the overlap between the conductive plate 1504 on the carriage and the patterned trace on the chassis oscillates as the carriage 1530 moves up and down. In such embodiments, the position sensor 1506 operates by measuring the capacitance of this parallel plate capacitor. Some embodiments include one or more resistors to be in the capacitor circuit loop, which may for example be mounted on the carriage FPC 1502 next to the driver 1524. From a home position, at maybe one end of travel of the actuator, as the carriage 1530 moves along the chassis, the number of capacitance oscillations indicates the gross position of the carriage 1530 in the chassis, whereas the actual capacitance value provides a finer measure of position. In other embodiments, position sensor 1506 is a Hall sensor.

In some embodiments, the moving body contacts the chassis at multiple surfaces so as to constrain the motion, and at least a proportion of each of these contact surfaces provides frictional force to control motion. In some embodiments, the inertial actuator is driven with an asymmetric oscillatory electrical signal so that in one half of the cycle the inertial acceleration is higher than in the other, and during at least a portion of the oscillatory motion, the inertial forces exceed the static friction of the contact points and cause sliding in the allowed linear degree of freedom.

In some embodiments, multiple such oscillatory cycles, in combination, yield a net motion of the moving body in one direction relative to the chassis, and the reverse motion can be achieved by appropriately altering the asymmetric electrical signal.

Figure 16:
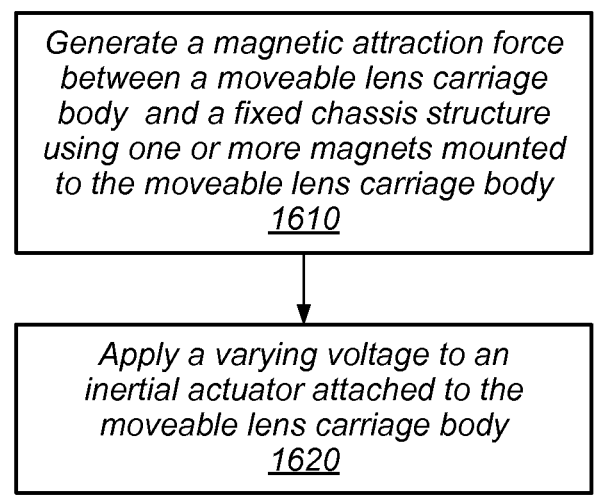
FIG. 16 is a flowchart of a method for operating a zoom actuator, according to one embodiment.

FIG. 16 is a flowchart of a method for operating a zoom actuator, according to one embodiment. A magnetic attraction force between a moveable lens carriage body and a fixed chassis structure is generated using one or more magnets mounted to the moveable lens carriage body (block 1610). A varying voltage is applied to an inertial actuator attached to the moveable lens carriage body (block 1620).

Figure 17:
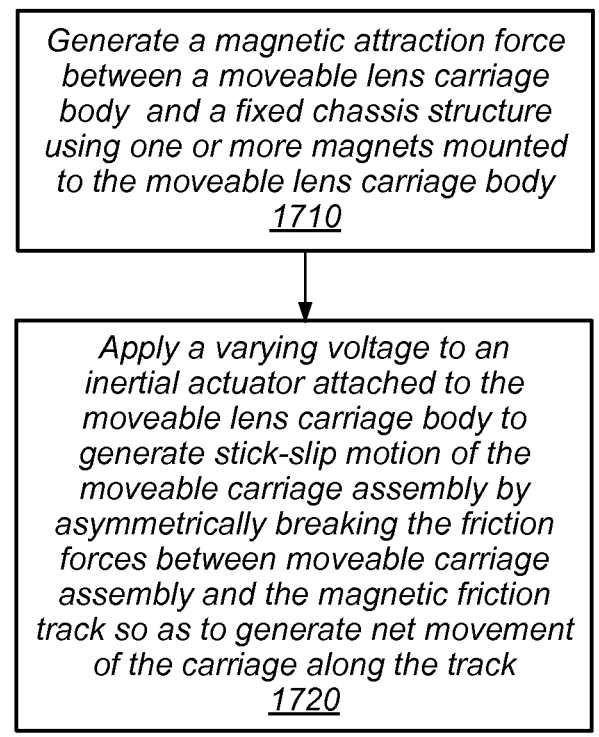
FIG. 17 is a flowchart of a method for operating a zoom actuator, according to one embodiment.

FIG. 17 is a flowchart of a method for operating a zoom actuator, according to one embodiment. A magnetic attraction force between a moveable lens carriage body and a fixed chassis structure is generated using one or more magnets mounted to the moveable lens carriage body (block 1710). A varying voltage is applied to an inertial actuator attached to the moveable lens carriage body to generate stick-slip motion of the moveable carriage assembly by asymmetrically breaking the friction forces between moveable carriage assembly and the magnetic friction track so as to generate net movement of the carriage along the track (block 1720).

Figure 18:
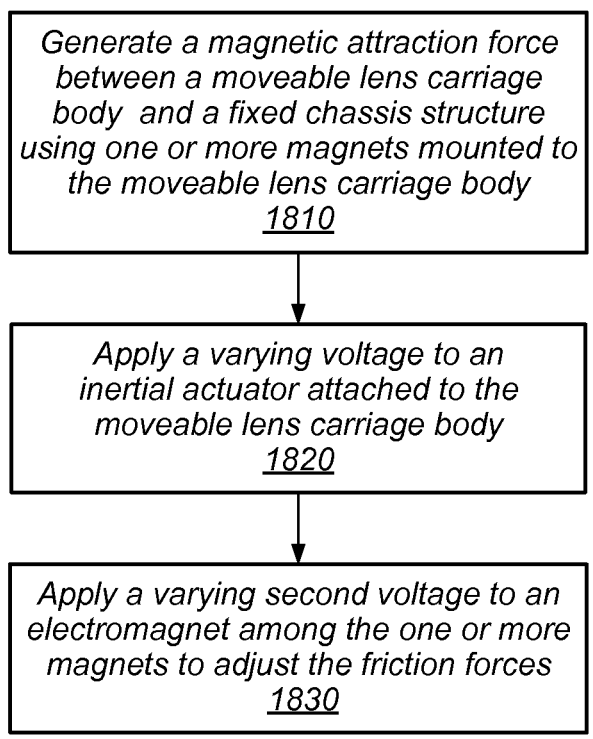
FIG. 18 is a flowchart of a method for operating a zoom actuator, according to one embodiment.

FIG. 18 is a flowchart of a method for operating a zoom actuator, according to one embodiment. A magnetic attraction force between a moveable lens carriage body and a fixed chassis structure is generated using one or more magnets mounted to the moveable lens carriage body (block 1810). A varying voltage is applied to an inertial actuator attached to the moveable lens carriage body (block 1820). A varying second voltage is applied to an electromagnet among the one or more magnets to adjust the friction forces (block 1780).

Figure 19:
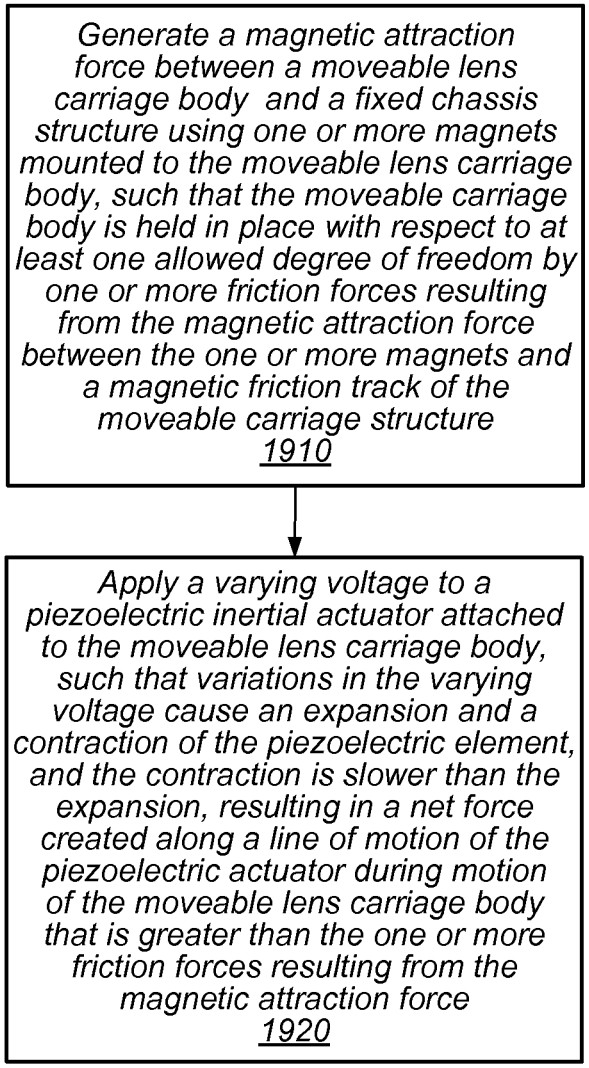
FIG. 19 is a flowchart of a method for operating a zoom actuator, according to one embodiment.

FIG. 19 is a flowchart of a method for operating a zoom actuator, according to one embodiment. A magnetic attraction force between a moveable lens carriage body and a fixed chassis structure is generated using one or more magnets mounted to the moveable lens carriage body, such that the moveable carriage body is held in place with respect to at least one allowed degree of freedom by one or more friction forces resulting from the magnetic attraction force between the one or more magnets and a magnetic friction track of the moveable carriage structure (block 1910). A varying voltage is applied to a piezoelectric inertial actuator attached to the moveable lens carriage body, such that variations in the varying voltage cause an expansion and a contraction of the piezoelectric element, and the contraction is slower than the expansion, resulting in a net force created along a line of motion of the piezoelectric actuator during motion of the moveable lens carriage body that is greater than the one or more friction forces resulting from the magnetic attraction force (block 1920).

Example Computer System

Figure 20:
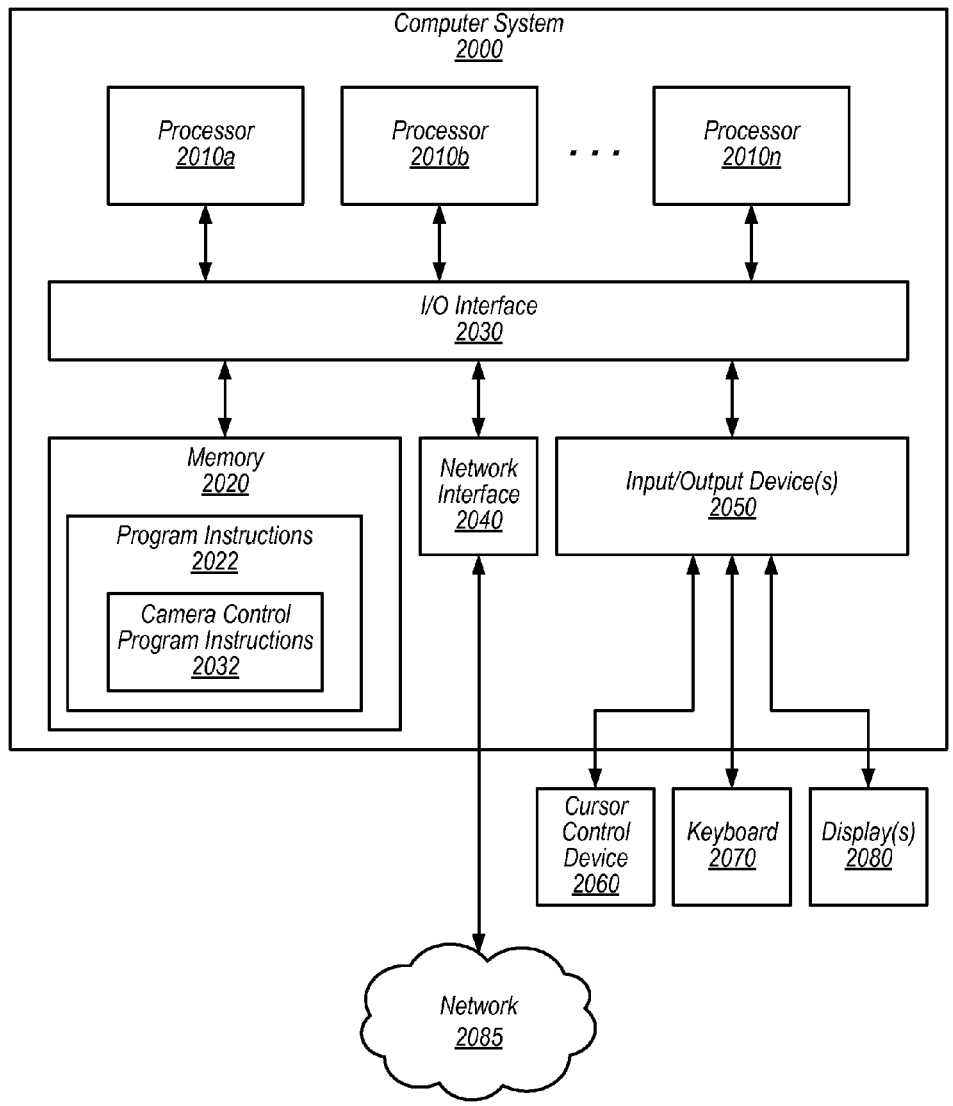
FIG. 20 illustrates an example computer system configured to implement aspects of the system and method for camera control, according to some embodiments.

FIG. 20 illustrates computer system 2000 that is configured to execute any or all of the embodiments described above. In different embodiments, computer system 2000 may be any of various types of devices, including, but not limited to, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion system as described herein, may be executed in one or more computer systems 2000, which may interact with various other devices. Note that any component, action, or functionality described above with respect to FIGS. 1-20 may be implemented on one or more computers configured as computer system 2000 of FIG. 20, according to various embodiments. In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. In some cases, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store camera control program instructions 2022 and/or camera control data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement a lens control application 2024 incorporating any of the functionality described above. Additionally, existing camera control data 2032 of memory 2020 may include any of the information or data structures described above. In some embodiments, program instructions and/or data may be received, sent or stored upon different types of computer-accessible media or on similar media separate from system memory 2020 or computer system 2000. While computer system 2000 is described as implementing the functionality of functional blocks of previous Figures, any of the functionality described herein may be implemented via such a computer system.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by one or more computer systems 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 20, memory 2020 may include program instructions 2022, which may be processor-executable to implement any element or action described above. In one embodiment, the program instructions may implement the methods described above. In other embodiments, different elements and data may be included. Note that data may include any data or information described above.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
    a fixed chassis structure, wherein
        the fixed chassis structure comprises a magnetic friction track; and
    a moveable carriage body, wherein
        the moveable carriage body carries one or more lenses,
        one or more magnets is mounted to the moveable carriage body,
        the moveable carriage body is movably mounted to the fixed chassis structure to allow movement along an optical axis through the one or more lenses,
        an inertial actuator is mounted to the moveable carriage body in an alignment such that an axis of motion of the inertial actuator is parallel to the optical axis through the one or more lenses, and
        the moveable carriage body is held in place with respect to at least one allowed degree of freedom by one or more friction forces resulting from a magnetic attraction force of the one or more magnets.

2. The system of claim 1, wherein
the moveable carriage body receives power and control signals to the inertial actuator through a flexible printed circuit configured to coil behind and unwind beneath the moveable carriage body during movement.

3. The system of claim 1, wherein:
the one or more magnets comprise one or more electromagnets.

4. The system of claim 1, wherein:
the moveable carriage body comprises one or more datum surfaces, wherein
    the datum surfaces serve as points of frictional contact between the moveable carriage body and magnetic friction track.

5. The system of claim 1, wherein
the moveable carriage body does not touch the fixed chassis structure except at the points of contact between the datum surfaces and the magnetic friction track.

6. The system of claim 1, wherein
the fixed chassis structure comprises an external housing of non-magnetic material.

7. The system of claim 1, wherein
the magnetic friction track comprises a strip of magnetic material mounted inside an enclosure formed by the fixed chassis structure.

8. A camera module, comprising:
one or more lenses that define an optical axis;
an image sensor; and
an actuator assembly, comprising:
    a fixed chassis structure comprising a magnetic friction track;
    a moveable carriage body that carries the one or more lenses;
    one or more magnets mounted to the moveable carriage body; and
    an inertial actuator mounted to the moveable carriage body in an alignment such that an axis of motion of the inertial actuator is parallel to the optical axis;
    wherein:
        the moveable carriage body is movably mounted to the fixed chassis structure to allow movement along the optical axis; and
        the moveable carriage body is held in place with respect to at least one allowed degree of freedom by one or more friction forces resulting from a magnetic attraction force of the one or more magnets.

9. The camera module of claim 8, wherein:
the moveable carriage body receives power and control signals to the inertial actuator through a flexible printed circuit configured to coil behind and unwind beneath the moveable carriage body during movement.

10. The camera module of claim 8, wherein:
the one or more magnets comprise one or more electromagnets.

11. The camera module of claim 8, wherein:
the moveable carriage body comprises one or more datum surfaces; and
the datum surfaces serve as points of frictional contact between the moveable carriage body and magnetic friction track.

12. The camera module of claim 8, wherein:
the moveable carriage does not touch the fixed chassis structure except at the points of contact between the datum surfaces and the magnetic friction track.

13. The camera module of claim 8, wherein:
the fixed chassis structure comprises an external housing of non-magnetic material.

14. The camera module of claim 8, wherein:
the magnetic friction track comprises a strip of magnetic material mounted inside an enclosure formed by the fixed chassis structure.

15. A mobile multifunction device, comprising:
a camera module, including:
   one or more lenses that define an optical axis;
   an image sensor; and
   an actuator assembly, comprising:
     a fixed chassis structure comprising a magnetic friction track;
     a moveable carriage body that carries the one or more lenses;
     one or more magnets mounted to the moveable carriage body; and
     an inertial actuator mounted to the moveable carriage body in an alignment such that an axis of motion of the inertial actuator is parallel to the optical axis;
   wherein:
     the moveable carriage body is movably mounted to the fixed chassis structure to allow movement along the optical axis; and
     the moveable carriage body is held in place with respect to at least one allowed degree of freedom by one or more friction forces resulting from a magnetic attraction force of the one or more magnets;
a display; and
one or more processors to:
   cause the camera module to capture an image; and
   cause the display to present the image.

16. The mobile multifunction device of claim 15, wherein:
the moveable carriage body receives power and control signals to the inertial actuator through a flexible printed circuit configured to coil behind and unwind beneath the moveable carriage body during movement.

17. The mobile multifunction device of claim 15, wherein:
the one or more magnets comprise one or more electromagnets.

18. The mobile multifunction device of claim 15, wherein:
the moveable carriage body comprises one or more datum surfaces; and
the datum surfaces serve as points of frictional contact between the moveable carriage body and magnetic friction track.

19. The mobile multifunction device of claim 15, wherein:
the moveable carriage does not touch the fixed chassis structure except at the points of contact between the datum surfaces and the magnetic friction track.

20. The mobile multifunction device of claim 15, wherein:
the fixed chassis structure comprises an external housing of non-magnetic material.

* * * * *